United States Patent
Lv et al.

(10) Patent No.: US 12,309,824 B2
(45) Date of Patent: May 20, 2025

(54) RADIO RESOURCE IDENTIFICATION METHOD AND APPARATUS

(71) Applicant: HUAWEI TECHNOLOGIES CO., LTD., Shenzhen (CN)

(72) Inventors: Yi Lv, Shenzhen (CN); Qian Zhu, Shenzhen (CN); Rui Ni, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 17/994,094

(22) Filed: Nov. 25, 2022

(65) Prior Publication Data

US 2023/0093039 A1    Mar. 23, 2023

Related U.S. Application Data

(63) Continuation of application No. PCT/CN2021/092214, filed on May 7, 2021.

(30) Foreign Application Priority Data

May 28, 2020    (CN) .......................... 202010470761.9

(51) Int. Cl.
H04W 72/542    (2023.01)
H04B 17/345    (2015.01)

(52) U.S. Cl.
CPC ........ H04W 72/542 (2023.01); H04B 17/345 (2015.01)

(58) Field of Classification Search
None
See application file for complete search history.

(56) References Cited

U.S. PATENT DOCUMENTS

2016/0044647 A1* 2/2016 Ashrafi ............... H04L 27/2601
370/330
2021/0211168 A1* 7/2021 Sasaki .................. H04B 10/112

OTHER PUBLICATIONS

3GPP TS 38.211, "3rd Generation Partnership Project, Technical Specification Group Radio Access Network, NR, Physical channels and modulation (Release 15)", Dec. 2019, 97 pages.

\* cited by examiner

*Primary Examiner* — Minh Trang T Nguyen
(74) *Attorney, Agent, or Firm* — Maier & Maier, PLLC

(57) ABSTRACT

A radio resource identification method and an apparatus. The method includes: obtaining OAM mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel; and determining a radio resource used for uplink transmission or downlink transmission.

20 Claims, 9 Drawing Sheets

RADIO RESOURCE IDENTIFICATION METHOD AND APPARATUS

CROSS-REFERENCE TO RELATED DISCLOSURES

This application is a continuation of International Application No. PCT/CN2021/092214, filed on May 7, 2021, which claims priority to Chinese Patent Application No. 202010470761.9, filed on May 28, 2020. The disclosures of the aforementioned disclosures are hereby incorporated by reference in their entireties.

TECHNICAL FIELD

The embodiments relate to the field of communications technologies, a radio resource identification method, and an apparatus.

BACKGROUND

Large capacity and high spectral efficiency have always been urgent problems to be resolved in the wireless communications field. In recent years, many novel wireless transmission technologies are emerging, such as a vortex electromagnetic wave technology carrying orbital angular momentum (OAM). A vortex electromagnetic wave has a feature of spatial spiral phase distribution because an electromagnetic field rotates around a propagation axis, so that a phase wavefront is spiral. An OAM electromagnetic wave includes a topological charge, which is referred to as an OAM mode. Electromagnetic waves carrying different OAM modes are orthogonal to each other when the electromagnetic waves are transmitted coaxially in space. Due to the inherent feature of the OAM, the OAM is independent of existing resources such as a frequency, time, a codeword, and polarization. Theoretically, if different information is loaded to different OAM modes and shares a same frequency band for non-interference transmission, a channel capacity of a wireless communication system can be increased, and spectral efficiency can be significantly improved.

In the conventional technology, different time domain information or code domain information may be distinguished by identifying a radio resource. How to identify a radio resource having OAM mode domain is a problem that needs to be concerned.

SUMMARY

The embodiments may provide a radio resource identification method and an apparatus, to identify a radio resource having OAM mode domain.

According to a first aspect, a radio resource identification method is provided, and the method may be implemented by using the following steps: obtaining orbital angular momentum (OAM) mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain; and determining, based on the OAM mode domain information, a radio resource used for uplink transmission or downlink transmission. According to the foregoing method, an OAM mode domain identifier can be used to determine a radio resource. The OAM mode domain identifier may be related to a transmission parameter of a vortex electromagnetic wave and may be considered as an OAM logical mode. Compared with a method for determining a radio resource by using an OAM physical mode, this method is more universal, thereby avoiding impact of a physical antenna array and the OAM physical mode on logic of a higher layer communication protocol.

The OAM mode domain identifier may correspond to a first sequence number in sorting sequence numbers of a plurality of ratios, and the plurality of ratios may be ratios between transmission parameters of vortex electromagnetic waves in the plurality of OAM physical modes and the reference value. If two or more ratios are equal, a plurality of equal ratios may be randomly sorted, or may be sorted according to a rule in which a smaller number of OAM physical modes corresponding to the ratios is ranked top, may be sorted according to a rule in which a positive number is ranked in front of a negative number, or may be sorted according to a combination thereof.

In a possible implementation, the OAM mode domain identifier corresponds to a first sequence number in sorting sequence numbers of the transmission parameters of the vortex electromagnetic waves in the plurality of OAM physical modes.

The sorting sequence numbers may meet any one of the following sorting rules: descending order, ascending order, parity, modulo operation, or weighted sorting. The OAM mode domain information may further include any one or a combination of a plurality of the following: a crosstalk coefficient, a beam diffusion angle, or the first OAM physical mode; both the crosstalk coefficient and the beam diffusion angle correspond to the first OAM physical mode; and the crosstalk coefficient includes: a crosstalk coefficient between the vortex electromagnetic wave and the plane electromagnetic wave in the first OAM physical mode, or a crosstalk coefficient between the vortex electromagnetic wave in the first OAM physical mode and the vortex electromagnetic wave in the specified OAM physical mode.

The obtaining OAM mode domain information may include: receiving the OAM mode domain information from a network device; or obtaining the stored OAM mode domain information.

The receiving the OAM mode domain information from a network device may include: receiving an uplink scheduling grant UL-Grant message from the network device, where the UL-Grant message carries the OAM mode domain information; or receiving downlink control information DCI from the network device, where the DCI carries the OAM mode domain information.

When the OAM mode domain information is received from the network device, the method may further include: receiving a first reference signal from the network device, where the first reference signal is the plane electromagnetic wave or the vortex electromagnetic wave in the specified OAM physical mode in the plurality of OAM physical modes; determining the reference value based on the first reference signal; and sending the reference value to the network device.

The method may further include: receiving a plurality of second reference signals from the network device, where the plurality of second reference signals are the vortex electromagnetic waves in the plurality of OAM physical modes; determining the transmission parameters of the vortex electromagnetic waves in the plurality of OAM physical modes based on the second reference signals; and sending the transmission parameters of the vortex electromagnetic waves in the plurality of OAM physical modes to the network device.

The method may further include: sending capability information to the network device, where the capability information includes a supported OAM physical mode used by the network device to send the vortex electromagnetic waves in the plurality of OAM physical modes based on the capability information.

The method may further include: receiving a mixed wave from the network device, where if the reference value is the transmission parameter of the plane electromagnetic wave, the mixed wave includes the vortex electromagnetic waves in the plurality of OAM physical modes and the plane electromagnetic wave; or if the reference value is the transmission parameter of the vortex electromagnetic wave in the specified OAM physical mode in the plurality of OAM physical modes, the mixed wave includes the vortex electromagnetic waves in the plurality of OAM physical modes; and the plurality of OAM physical modes include the first OAM physical mode; determining, based on the mixed wave, a crosstalk coefficient between a vortex electromagnetic wave in each OAM physical mode and a wave corresponding to the reference value; and sending the determined crosstalk coefficient to the network device.

The OAM mode domain identifier may include an integer and/or a fraction. If the OAM mode domain identifier is the fraction, a capability of resisting wireless multipath channel effect can be improved. The OAM mode domain identifier in this embodiment is more flexible. In addition, this embodiment may not require that antenna array specifications of a transmit end and a receive end be the same and may be applied to a scenario in which the antenna array specifications of the transmit end and the receive end are different. This embodiment also does not require that antenna array specifications of different OAM modes be the same and may be applied to a scenario in which the antenna array specifications of the different OAM modes are different. This embodiment is more universal and flexible. In conclusion, the OAM mode domain identifier in this embodiment can avoid impact of the physical antenna array and the physical OAM mode on logic of the higher layer communication protocol. In addition, measurement performance represented by a signal-to-noise ratio is used for calculation, and a converted logical mode is used as a scheduling reference. This greatly improves universality and flexibility of a scheduling algorithm.

The first transmission parameter or the transmission parameter may include any one or a combination of the following: a signal-to-noise ratio, reference signal received power, a bit error rate, a block error rate, a packet error rate, a quantity of retransmissions upon failure, or a delay of successful transmission.

Determining a radio resource based on the OAM mode domain information may include: determining the radio resource based on the OAM mode domain information in combination with a time domain identifier and/or a frequency domain identifier. The radio resource may be extended from a time-frequency two-dimensional dimension to a time-frequency-mode three-dimensional dimension. In addition, the OAM mode domain identifier is used to map a mode domain resource to a normalized resource irrelevant to the physical antenna. This also enhances flexibility of scheduling a time-frequency-mode three-dimensional radio resource. An OAM mode domain dimension is added to support simultaneous communication of a plurality of data streams on a same time-frequency resource and a same antenna port.

According to a second aspect, a radio resource identification method is provided, and the method includes the following steps: determining orbital angular momentum (OAM) mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain; and sending the OAM mode domain information to a terminal device. According to the foregoing method, an OAM mode domain identifier can be used to determine a radio resource. The OAM mode domain identifier may be related to a transmission parameter of a vortex electromagnetic wave and may be considered as an OAM logical mode. Compared with a method for determining a radio resource by using an OAM physical mode, this method is more universal, thereby avoiding impact of a physical antenna array and the OAM physical mode on logic of a higher layer communication protocol.

The method may further include: determining a plurality of OAM mode domain identifiers, where the plurality of OAM mode domain identifiers include the first OAM mode domain identifier; and sending the plurality of OAM mode domain identifiers to the terminal device; and the determining a plurality of OAM mode domain identifiers includes: sending vortex electromagnetic waves in the plurality of OAM physical modes to the terminal device, and receiving transmission parameters that are of the vortex electromagnetic waves in the plurality of OAM physical modes and that are fed back by the terminal device; and obtaining the plurality of OAM mode domain identifiers according to sorting sequence numbers of the transmission parameters of the vortex electromagnetic waves in the plurality of OAM physical modes. If two or more transmission parameters are equal, a plurality of equal transmission parameters may be randomly sorted or may be sorted according to a rule in which a smaller number of OAM physical modes is ranked top, may be sorted according to a rule in which a positive number is ranked in front of a negative number, or may be sorted according to a combination thereof.

Alternatively, the determining a plurality of OAM mode domain identifiers includes: sending a reference electromagnetic wave, and receiving a transmission parameter that is of the reference electromagnetic wave and that is fed back by a terminal device; and sending vortex electromagnetic waves in the plurality of OAM physical modes to the terminal device, and receiving transmission parameters that are of the vortex electromagnetic waves in the plurality of OAM physical modes and that are fed back by the terminal device; and determining a ratio between a transmission parameter of a vortex electromagnetic wave in each OAM physical mode to a transmission parameter of the reference electromagnetic wave, to obtain a plurality of ratios corresponding to the plurality of OAM physical modes; and obtaining the plurality of OAM mode domain identifiers according to sorting sequence numbers of the plurality of ratios, where the reference electromagnetic wave is the plane electromagnetic wave or the vortex electromagnetic wave in the specified OAM physical mode in the plurality of OAM physical modes. Optionally, if two or more ratios are equal, a plurality of equal ratios may be randomly sorted, or may be sorted according to a rule in which a smaller number of OAM physical modes corresponding to the ratios is ranked top, may be sorted according to a rule in which a positive number is ranked in front of a negative number, or may be sorted according to a combination thereof.

The method may further include: receiving capability information from the terminal device, where the capability information indicates an OAM physical mode supported by the terminal device; and determining, based on the capability information, the vortex electromagnetic waves that are in the plurality of OAM physical modes and that are sent to the terminal device, where the sent vortex electromagnetic waves in the OAM physical modes can be supported by the terminal device.

The method may further include: sending a mixed wave to the terminal device, where the mixed wave includes the vortex electromagnetic waves in the plurality of OAM physical modes and the reference electromagnetic wave, and the reference electromagnetic wave is the plane electromagnetic wave or the vortex electromagnetic wave in the specified OAM physical mode in the plurality of OAM physical modes; receiving, from the terminal device, crosstalk coefficients between each of the vortex electromagnetic waves in the plurality of OAM physical modes and the reference electromagnetic wave; and sending, to the terminal device, the crosstalk coefficients respectively corresponding to the plurality of OAM mode domain identifiers.

The method may further include: determining beam diffusion angles of the plurality of OAM physical modes; and sending the beam diffusion angles respectively corresponding to the plurality of OAM mode domain identifiers.

The OAM mode domain identifier may include an integer and/or a fraction. If the OAM mode domain identifier is the fraction, a capability of resisting wireless multipath channel effect can be improved. The OAM mode domain identifier in this embodiment is more flexible. In addition, this embodiment may not require that antenna array specifications of a transmit end and a receive end be the same and may be applied to a scenario in which the antenna array specifications of the transmit end and the receive end are different. This embodiment also does not require that the antenna array specifications of the different OAM modes be the same and may be applied to a scenario in which antenna array specifications of different OAM modes are different. This embodiment is more universal and flexible. In conclusion, the OAM mode domain identifier in this embodiment can avoid impact of the physical antenna array and the physical OAM mode on logic of the higher layer communication protocol. In addition, measurement performance represented by a signal-to-noise ratio is used for calculation, and a converted logical mode is used as a scheduling reference. This greatly improves universality and flexibility of a scheduling algorithm.

The transmission parameter may include any one or a combination of the following: a signal-to-noise ratio, reference signal received power, a bit error rate, a block error rate, a packet error rate, a quantity of retransmissions upon failure, or a delay of successful transmission.

According to a third aspect, a communication apparatus is provided. The apparatus may be a terminal device, may be an apparatus (for example, a chip, a chip system, or a circuit) in a terminal device, or may be an apparatus that can be used with a terminal device. The apparatus has a function of implementing the method in the first aspect. The function may be implemented by hardware or may be implemented by hardware executing corresponding software. The hardware or the software includes one or more modules corresponding to the foregoing function. The apparatus may include an obtaining module and a determining module. For example, the obtaining module is configured to obtain orbital angular momentum (OAM) mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain; and the determining module is configured to determine, based on the OAM mode domain information, a radio resource used for uplink transmission or downlink transmission.

The OAM mode domain identifier may correspond to a first sequence number in sorting sequence numbers of a plurality of ratios, and the plurality of ratios may be ratios between transmission parameters of vortex electromagnetic waves in the plurality of OAM physical modes and the reference value.

The sorting sequence numbers may meet any one of the following sorting rules: descending order, ascending order, parity, modulo operation, or weighted sorting.

The OAM mode domain information may further include any one or a combination of a plurality of the following: a crosstalk coefficient, a beam diffusion angle, or the first OAM physical mode; both the crosstalk coefficient and the beam diffusion angle correspond to the first OAM physical mode; and the crosstalk coefficient includes: a crosstalk coefficient between the vortex electromagnetic wave and the plane electromagnetic wave in the first OAM physical mode, or a crosstalk coefficient between the vortex electromagnetic wave in the first OAM physical mode and the vortex electromagnetic wave in the specified OAM physical mode.

The apparatus may further include:

a communication module, configured to receive a first reference signal from a network device, where the first reference signal is the plane electromagnetic wave or the vortex electromagnetic wave in the specified OAM physical mode in the plurality of OAM physical modes;

the determining module is further configured to determine the reference value based on the first reference signal; and the communication module is further configured to send the reference value to the network device.

The communication module may be further configured to receive a plurality of second reference signals from the network device, where the plurality of second reference signals are the vortex electromagnetic waves in the plurality of OAM physical modes;

the determining module is further configured to determine the transmission parameters of the vortex electromagnetic waves in the plurality of OAM physical modes based on the second reference signals; and the communication module is further configured to send the transmission parameters of the vortex electromagnetic waves in the plurality of OAM physical modes to the network device.

The communication module may be further configured to send capability information to the network device, where the capability information includes a supported OAM physical mode.

The communication module may be further configured to receive a mixed wave from the network device; if the reference value is the transmission parameter of the plane electromagnetic wave, the mixed wave includes the vortex electromagnetic waves in the plurality of OAM physical modes and the plane electromagnetic wave; or if the reference value is the transmission parameter of the vortex electromagnetic wave in the specified OAM physical mode in the plurality of OAM physical modes, the mixed wave includes the vortex electromagnetic waves in the plurality of OAM physical modes; and the plurality of OAM physical modes include the first OAM physical mode; and the determining module is further configured to determine, based on the mixed wave, a crosstalk coefficient between a vortex electromagnetic wave in each OAM physical mode and a wave corresponding to the reference value; and the communication module is further configured to send the determined crosstalk coefficient to the network device.

The OAM mode domain identifier may include an integer and/or a fraction.

The first transmission parameter or the transmission parameter may include any one or a combination of the following: a signal-to-noise ratio, reference signal received power, a bit error rate, a block error rate, a packet error rate, a quantity of retransmissions upon failure, or a delay of successful transmission.

The determining module may be configured to determine the radio resource based on the OAM mode domain information in combination with a time domain identifier and/or a frequency domain identifier.

According to a fourth aspect, a communication apparatus is provided. The apparatus may be a network device, may be an apparatus (for example, a chip, a chip system, or a circuit) in a network device, or may be an apparatus that can be used with a network device. The apparatus may include modules that are in one-to-one correspondence with the method/operations/steps/actions described in the second aspect. The modules may be implemented by using a hardware circuit, software, or a combination of a hardware circuit and software. The apparatus may include a determining module and a communication module. For example, the determining module is configured to determine orbital angular momentum (OAM) mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain; and the communication module is configured to send the OAM mode domain information to a terminal device.

The determining module may be further configured to determine a plurality of OAM mode domain identifiers, and the plurality of OAM mode domain identifiers includes the first OAM mode domain identifier; and the communication module is further configured to send the plurality of OAM mode domain identifiers; and when determining the plurality of OAM mode domain identifiers, the communication module is configured to send vortex electromagnetic waves in the plurality of OAM physical mode, and receive transmission parameters that are of the vortex electromagnetic waves in the plurality of OAM physical modes and that are fed back by the terminal device; and the determining module is configured to obtain the plurality of OAM mode domain identifiers according to sorting sequence numbers of the transmission parameters of the vortex electromagnetic waves in the plurality of OAM physical modes; or the communication module is configured to: send a reference electromagnetic wave, and receive a transmission parameter that is of the reference electromagnetic wave and that is fed back by a terminal device; and send vortex electromagnetic waves in the plurality of OAM physical modes, and receive transmission parameters that are of the vortex electromagnetic waves in the plurality of OAM physical modes and that are fed back by the terminal device; and the determining module is configured to determine a ratio between a transmission parameter of a vortex electromagnetic wave in each OAM physical mode to a transmission parameter of the reference electromagnetic wave, to obtain a plurality of ratios corresponding to the plurality of OAM physical modes, and obtain the plurality of OAM mode domain identifiers according to sorting sequence numbers of the plurality of ratios, where the reference electromagnetic wave is the plane electromagnetic wave or the vortex electromagnetic wave in the specified OAM physical mode in the plurality of OAM physical modes.

The apparatus may further include:

receiving capability information from the terminal device, where the capability information indicates an OAM physical mode supported by the terminal device; and determining, based on the capability information, the vortex electromagnetic waves in the plurality of OAM physical modes.

The communication module may be further configured to:

send a mixed wave, where the mixed wave includes the vortex electromagnetic waves in the plurality of OAM physical modes and the reference electromagnetic wave, and the reference electromagnetic wave is the plane electromagnetic wave or the vortex electromagnetic wave in the specified OAM physical mode in the plurality of OAM physical modes;

receive, from the terminal device, crosstalk coefficients between each of the vortex electromagnetic waves in the plurality of OAM physical modes and the reference electromagnetic wave; and send the crosstalk coefficients respectively corresponding to the plurality of OAM mode domain identifiers.

The determining module may be further configured to determine beam diffusion angles of the plurality of OAM physical modes; and the communication apparatus is further configured to send the beam diffusion angles respectively corresponding to the plurality of OAM mode domain identifiers.

The OAM mode domain identifier may include an integer and/or a fraction.

The transmission parameter may include any one or a combination of the following: a signal-to-noise ratio, reference signal received power, a bit error rate, a block error rate, a packet error rate, a quantity of retransmissions upon failure, or a delay of successful transmission.

According to a fifth aspect, an embodiment may provide a communication apparatus. The apparatus includes a communication interface and a processor. The communication interface is configured for communication between the apparatus and another device, for example, data or signal receiving and sending. For example, the communication interface may be a transceiver, a circuit, a bus, a module, or a communication interface of another type, and the another device may be a network device. The processor is configured to invoke a group of programs, instructions, or data to perform the method described in the first aspect. The apparatus may further include a memory, configured to store the programs, the instructions, or the data invoked by the processor. The memory is coupled to the processor. When executing the instructions or the data stored in the memory, the processor may implement the method described in the first aspect.

According to a sixth aspect, an embodiment may provide a communication apparatus. The apparatus includes a communication interface and a processor. The communication interface is configured for communication between the apparatus and another device, for example, data or signal receiving and sending. For example, the communication interface may be a transceiver, a circuit, a bus, a module, or a communication interface of another type, and the another device may be a terminal device. The processor is configured to invoke a group of programs, instructions, or data to perform the method described in the second aspect. The apparatus may further include a memory, configured to store the programs, the instructions, or the data invoked by the processor. The memory is coupled to the processor. When executing the instructions or the data stored in the memory, the processor may implement the method described in the second aspect.

According to a seventh aspect, an embodiment may further provide a non-transitory computer-readable storage medium. The non-transitory computer-readable storage medium stores computer-readable instructions, and when the computer-readable instructions are run on a computer, the method according to the first aspect or the second aspect is performed.

According to an eighth aspect, an embodiment may provide a chip system. The chip system includes a processor, and may further include a memory, configured to implement the method in the first aspect or the second aspect. The chip system may include a chip or may include a chip and another discrete component.

According to a ninth aspect, an embodiment may provide a communication system. The system includes a terminal device and a network device, the terminal device is configured to perform the method in the first aspect, and the network device is configured to perform the method in the second aspect.

According to a tenth aspect, a computer program product including instructions is provided. When the computer program product is run on a computer, the method in the first aspect or the second aspect is performed.

DETAILED DESCRIPTION OF THE EMBODIMENTS

The embodiments may provide a radio resource identification method and an apparatus. Because problem-resolving principles of the method and the apparatus are similar, mutual reference may be made between implementation of the apparatus and implementation of the method. Repeated description is not provided herein again. In descriptions of embodiments, the term "and/or" describes an association relationship between associated objects and indicates that three relationships may exist. For example, A and/or B may indicate the following three cases: only A exists, both A and B exist, and only B exists. The character "/" generally indicates an "or" relationship between the associated objects. In this disclosure, "at least one" means one or more, and "a plurality of" means two or more. In addition, it should be understood that, in the description of the embodiments, terms such as "first", "second", and "third" are merely used for distinguishing and description, but should not be understood as an indication or implication of relative importance or should not be understood as an indication or implication of a sequence.

The radio resource identification method provided in embodiments may be applied to a fourth generation (4G) communication system, for example, a long term evolution (LTE) system; may be applied to a fifth generation (5G) communication system, for example, 5G new radio (NR); may be applied to various future communication systems, for example, a sixth generation (6G) communication system; or may be applied to a Bluetooth system, a Wi-Fi system, a LoRa system, or an internet of vehicles system. The method provided in embodiments may be applied to a satellite communication system, where the satellite communication system may be integrated with the foregoing communication system.

Figure 1:
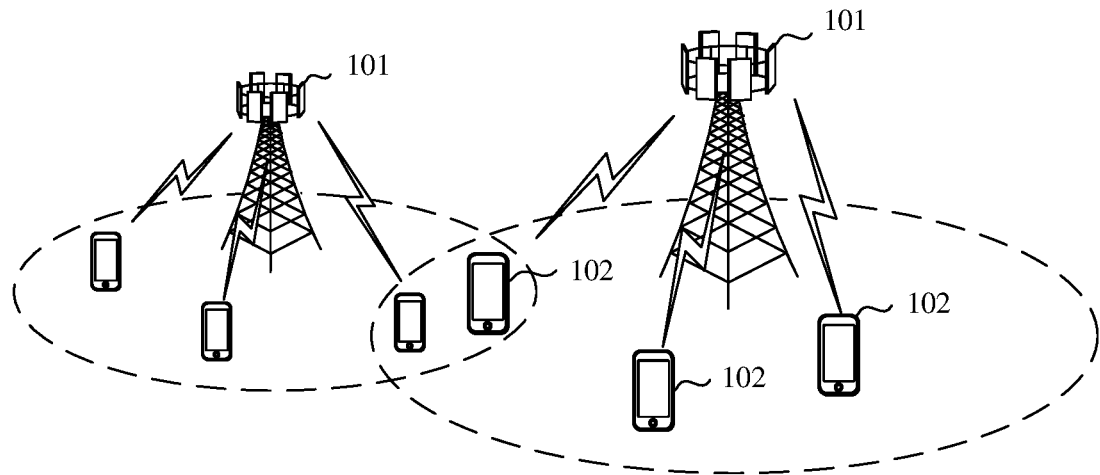
FIG. 1 is a schematic diagram of an architecture of a communication system according to an embodiment.

For ease of understanding the embodiments, a disclosure scenario used in this disclosure is described by using an architecture of a communication system shown in FIG. 1 as an example. As shown in FIG. 1, a communication system 100 includes a network device 101 and a terminal device 102. The apparatus provided in embodiments may be applied to the network device 101 or may be applied to the terminal device 102. It may be understood that FIG. 1 shows only a possible architecture, to which embodiments may be applied, of the communication system. In another possible scenario, the architecture of the communication system may alternatively include another device.

The network device 101 may be a node in a radio access network (RAN) and may also be referred to as a base station or a RAN node (or device). Currently, some examples of the network device 101 are: a gNB/NR-NB, a transmission reception point (TRP), an evolved NodeB (eNB), a radio network controller (RNC), a NodeB (NB), a base station controller (BSC), a base transceiver station (BTS), a home base station (HNB), a baseband unit (BBU), a wireless fidelity (Wi-Fi) access point (AP), a satellite device, a network device in a 5G communication system, and a network device in a possible communication system in the future. The network device 101 may alternatively be another device that has a function of the network device. For example, the network device 101 may alternatively be a device that functions as a network device in D2D communication, vehicle-to-everything communication, or machine communication. Alternatively, the network device 101 may alternatively be a network device in a possible future communication system.

In some deployments, a gNB may include a central unit (CU) and a DU. The gNB may further include a radio unit (RU). The CU implements a part of functions of the gNB, and the DU implements a part of the functions of the gNB. For example, the CU implements functions of a radio resource control (RRC) layer and a packet data convergence protocol (PDCP) layer. The DU implements functions of a radio link control (RLC) layer, a media access control (MAC) layer, and a physical (PHY) layer. Information at the RRC layer eventually becomes information at the PHY layer or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

The terminal device 102 may also be referred to as user equipment (UE), a mobile station (MS), a mobile terminal (MT), or the like, and is a device that provides a user with voice or data connectivity, or may be an internet of things device. For example, the terminal device includes a handheld device, a vehicle-mounted device, or the like that has a wireless connection function. Currently, the terminal device may be a mobile phone, a tablet computer, a notebook computer, a palmtop computer, a mobile internet device (MID), a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot air balloon, an uncrewed aerial vehicle, or an aircraft), or the like. The terminal device may alternatively be another device having a terminal function. For example, the terminal device may alternatively be a device functioning as a terminal function in D2D communication. The terminal device having a wireless transceiver function and a chip that may be disposed in the terminal device are collectively referred to as a terminal device in this disclosure.

In a wireless communication system, a radio resource may be identified, so that an uplink or downlink transmission resource is determined between the terminal device and the network device. In this embodiment, the radio resource includes a resource used for uplink transmission or downlink transmission. The radio resource may include resources in a plurality of dimensions, for example, a time domain dimension, a frequency domain dimension, a code domain dimension, a polarization dimension, an antenna (space) dimension, or an OAM mode domain dimension.

The following uses an example to describe the radio resource identification method.

In an embodiment, Table 1 is used as an example, and a fifth generation (5G) communication system supports a dynamic orthogonal frequency division multiplexing (OFDM) subcarrier spacing and a radio resource identification method thereof.

TABLE 1

| $\mu$ | $\Delta f = 2^\mu \cdot 15$ [kHz] | Cyclic prefix |
|---|---|---|
| 0 | 15 | Normal (normal) |
| 1 | 30 | normal |
| 2 | 60 | normal, extended (extended) |
| 3 | 120 | normal |
| 4 | 240 | normal |

As shown in Table 1, in 5G, different OFDM subcarrier spacings from 15 kHz to 240 kHz are respectively identified as $\mu=0, 1, 2, 3, 4$, and are respectively corresponding to cyclic prefixes of different lengths. In this radio resource identification method, a parameter set that can be flexibly extended is set, so that 5G can support flexibility of simultaneously deploying a plurality of services. In different disclosure scenarios, the network device dynamically selects a subcarrier spacing and a cyclic prefix configuration in Table 1 based on a multipath delay of a wireless channel and a delay requirement of a communication service.

Figure 2:
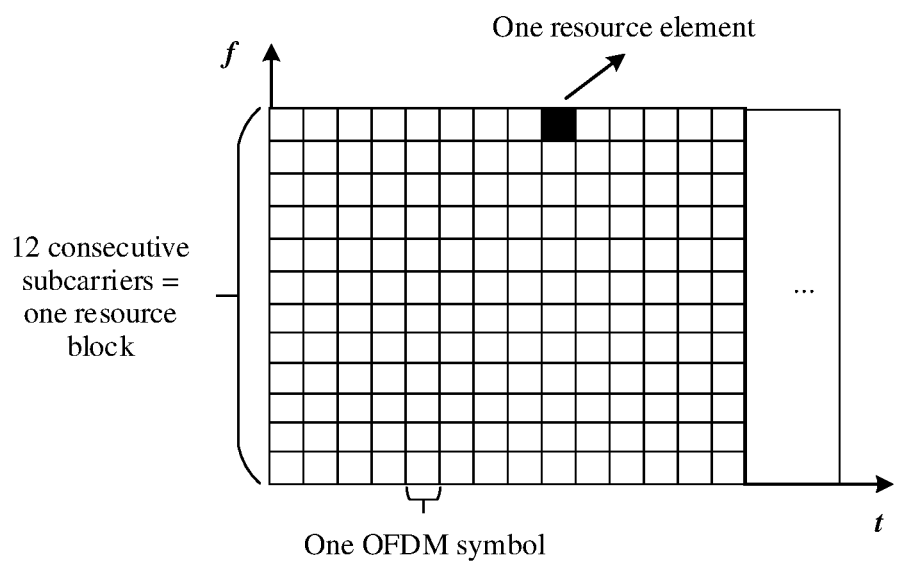
FIG. 2 is a schematic diagram of an RE identification method according to an embodiment.

As shown in FIG. 2, resource elements (RE) corresponding to 12 consecutive subcarriers in frequency domain form one resource block (resource block, RB). $(k,l)_{p,\mu}$ may be used to identify the RE, and $(k,l)_{p,\mu}$ represents: in a $\mu^{th}$ OFDM transmission parameter configuration, a $k^{th}$ frequency domain symbol and an $l^{th}$ time domain symbol that are of a $p^{th}$ antenna port and that are relative to a reference point.

According to the radio resource identification method provided in this embodiment, a radio resource having an OAM mode domain dimension can be identified.

To better understand the method in this disclosure, OAM mode domain and some other terms or concepts in this disclosure are first described.

An OAM is an inherent attribute of an electromagnetic wave and corresponds to a spiral phase wavefront of a beam in space. Electromagnetic waves carrying different OAM modes are orthogonal to each other during coaxial transmission in space. Therefore, theoretically different information is modulated to the electromagnetic waves in the different OAM modes for multiplexing, so that a channel capacity of the wireless communication system can be increased.

An OAM beam is generated by using an antenna array, which is a convenient method for generating the OAM beam. The antenna array, also referred to as an antenna array, is formed by feeding and spatially arranging two or more single antennas working at a same frequency according to certain requirements. Antenna radiation units that constitute the antenna array are referred to as array elements. The antenna array includes a transmit antenna array and a receive antenna array. A structure of the antenna array includes a uniform circular array (UCA), a uniform linear array (ULA), and the like. In this embodiment, a structure of the antenna array is not limited.

The OAM mode, also referred to as an OAM physical mode, or a physical OAM mode, is one of inherent attributes of the electromagnetic wave. The OAM mode may be any integer, for example, −1, 1, 2, or 3. Alternatively, the OAM mode may be a one-dimensional array formed by integers. A quantity of OAM modes included in the one-dimensional array is not limited, for example, a limited quantity such as [−2, −1, 1, 2], or an unlimited quantity of OAM modes. It may be understood that, in actual disclosure, a combination may include an OAM mode of a transmit beam and an OAM mode of a receive beam, or a combination may include an OAM mode of a transmit beam, and another combination may include an OAM mode of a receive beam. Generally, the OAM mode is an integer.

Based on a concept of the OAM physical mode, the OAM mode in this embodiment may be understood as an OAM logical mode. Different from the OAM physical mode, the OAM logical mode can be an integer or a fraction. In this embodiment, the OAM logical mode may also be referred to as an OAM mode domain identifier. Any plurality of waveform symbols may pass through a same vortex electromagnetic wave channel when being transmitted over resources identified by a same OAM mode domain Based on this, the OAM mode domain identifier may also be referred to as an OAM mode domain port. A method for defining the OAM mode domain port is similar to a method for defining an antenna port in the 5G NR standard. The OAM mode domain port is defined as follows: When a waveform symbol is transmitted through a mode port, a vortex electromagnetic wave channel that the waveform symbol passes through is the same as a vortex electromagnetic wave channel that another waveform symbol transmitted through the OAM mode domain port passes through. In other words, the terminal considers that whether two transmitted signals pass through a same vortex electromagnetic wave channel depends on whether the two signals are sent through a same OAM mode domain port. Similarly, the OAM mode domain port is a logical concept, and does not correspond to an OAM physical mode or physical antenna array.

A transmission parameter can represent a channel feature of an electromagnetic wave, or in other words, the transmission parameter represents measurement performance of an electromagnetic wave communication effect. In this embodiment, the transmission parameter may represent performance of an electromagnetic wave signal. For example, the transmission parameter may be any one or a combination of the following: a signal-to-noise ratio (SNR), a reference signal received power (RSRP), a bit error rate (BER), a block error rate, a packet error rate (PER), a quantity of retransmissions upon failure, or a delay of successful transmission. The description of the transmission parameter can be applied to a plane electromagnetic wave and a vortex electromagnetic wave in any OAM physical mode.

The plane electromagnetic wave may be considered as a vortex electromagnetic wave whose OAM physical mode is 0.

Figure 3:
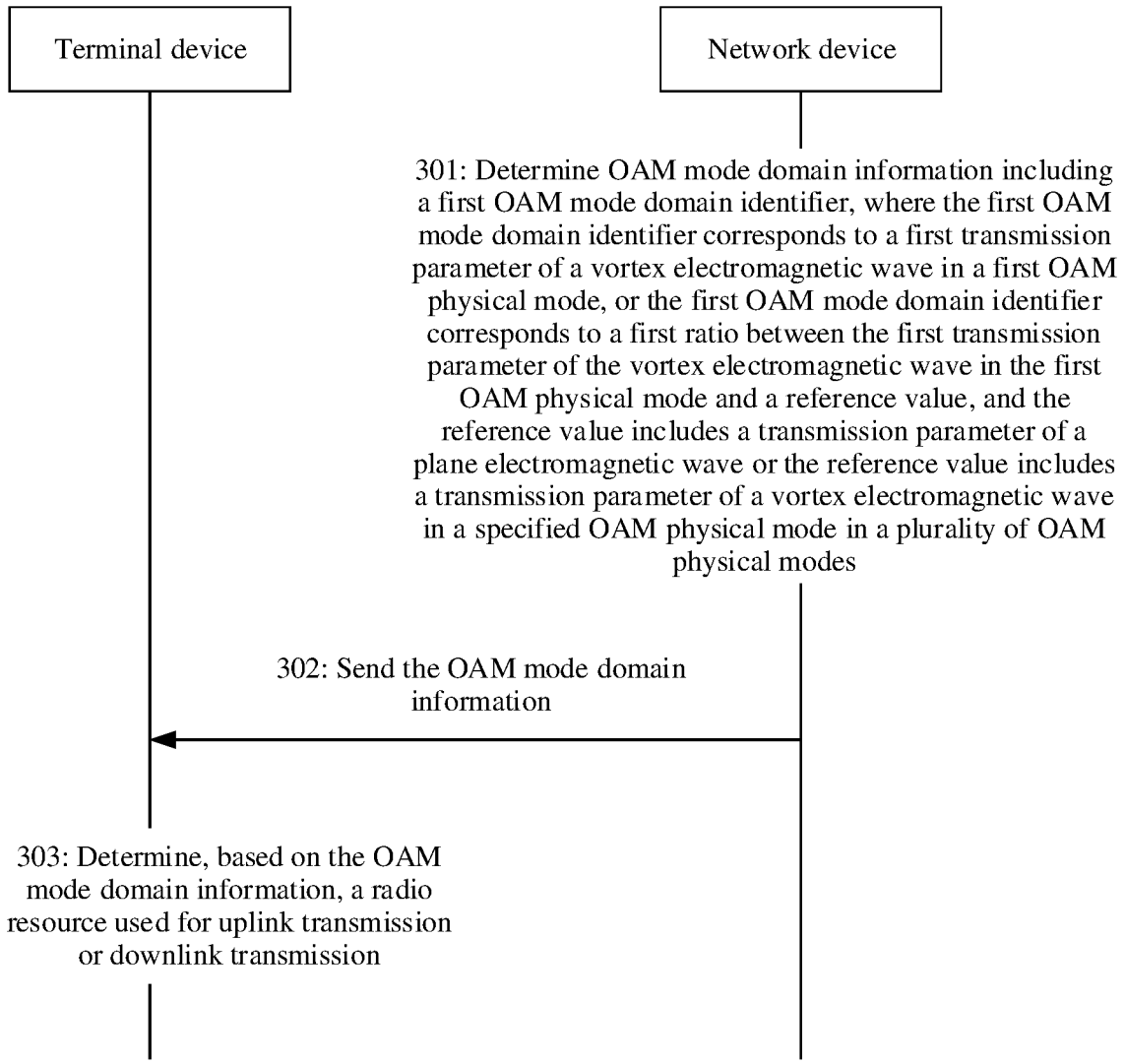
FIG. 3 is a schematic flowchart of a radio resource identification method according to an embodiment.

As shown in FIG. 3, the following describes a radio resource identification method provided in an embodiment.

S301: A network device determines OAM mode domain information.

The OAM mode domain information includes a first OAM mode domain identifier. The first OAM mode domain identifier corresponds to a first transmission parameter of a vortex electromagnetic wave in a first OAM physical mode, or the first OAM mode domain identifier corresponds to a first ratio between the first transmission parameter of the vortex electromagnetic wave in the first OAM physical mode and a reference value. The reference value includes a transmission parameter of a plane electromagnetic wave, or the reference value includes a transmission parameter of a vortex electromagnetic wave in a specified OAM physical mode in a plurality of OAM physical modes.

S302: The network device sends the OAM mode domain information to a terminal device, and the terminal device receives the OAM mode domain information from the network device.

S303: The terminal device determines, based on the OAM mode domain information, a radio resource used for uplink transmission or downlink transmission.

In the embodiment in FIG. 3, an OAM mode domain identifier can be used to determine a radio resource. The OAM mode domain identifier may be related to a transmission parameter of a vortex electromagnetic wave and may be considered as an OAM logical mode. Compared with a method for determining a radio resource by using an OAM physical mode, this method is more universal, thereby avoiding impact of a physical antenna array and the OAM physical mode on logic of a higher layer communication protocol.

The following describes some optional implementations of the embodiment in FIG. 3 by using examples.

Figure 4:
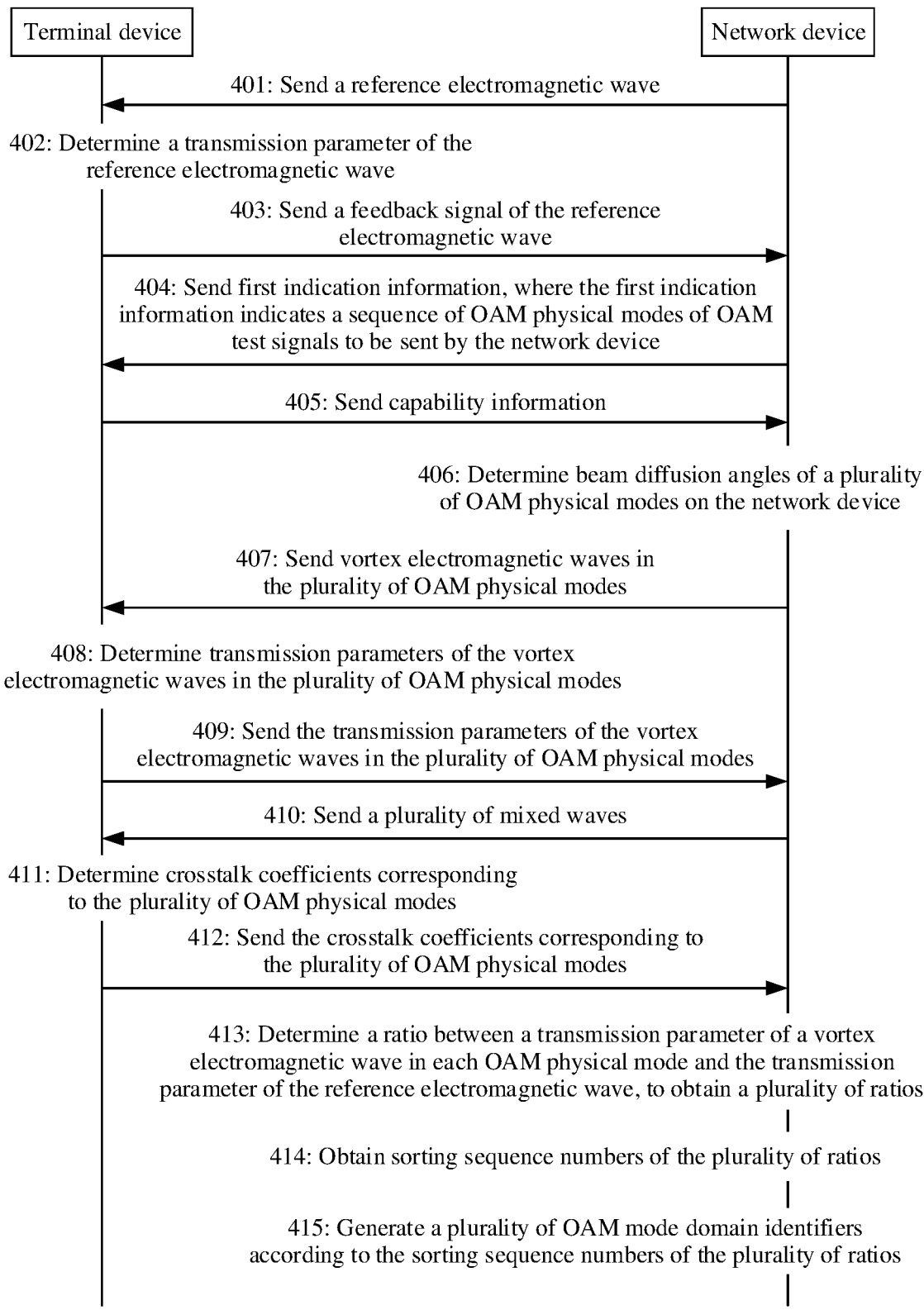
FIG. 4 is a first schematic flowchart of a method for determining an OAM mode domain identifier by a network device according to an embodiment.

First, a method for determining the OAM mode domain identifier by the network device is described. Details are shown in FIG. 4.

S401: The network device sends a reference electromagnetic wave to the terminal device, and the terminal device receives the reference electromagnetic wave from the network device.

The reference electromagnetic wave is the plane electromagnetic wave signal, or the reference electromagnetic wave is the vortex electromagnetic wave in the specified OAM physical mode in the plurality of OAM physical modes. The plurality of OAM physical modes are OAM physical modes of a plurality of OAM test signals to be sent by the network device.

For example, the reference electromagnetic wave may be a reference signal (reference signal, RS).

S402: The terminal device determines a transmission parameter of the reference electromagnetic wave.

The transmission parameter of the reference electromagnetic wave may include, for example, any one or any combination of the following: an SNR, reference signal received power, a bit error rate, a block error rate, a packet error rate, a quantity of retransmissions upon failure, or a delay of successful transmission. In this embodiment, the signal-to-noise ratio is used as an example for description. The transmission parameter of the reference electromagnetic wave may be used as a reference value for determining an OAM mode domain identifier.

The terminal device may further determine a direction of arrival (direction of arrival, DOA) of the reference electromagnetic wave.

S403: The terminal device sends a feedback signal of the reference electromagnetic wave to the network device, and the network device receives the feedback signal of the reference electromagnetic wave from the terminal device.

The feedback signal of the reference electromagnetic wave carries the determined transmission parameter of the reference electromagnetic wave.

For example, the feedback signal of the reference electromagnetic wave may be a channel state information (CSI) report. S404: The network device sends first indication information to the terminal device, and the terminal device receives the first indication information from the network device.

The first indication information indicates a sequence of OAM physical modes of OAM test signals to be sent by the network device. For example, the first indication information indicates that the OAM physical modes of the OAM test signals to be sent by the network device are sequentially [1+1, −1, +2, −2, +3, . . . ]. S405: The terminal device sends capability information to the network device, and the network device receives the capability information from the terminal device.

The capability information may include any one or more of the following: a supported OAM physical mode or a quantity of antenna elements of the terminal device. The quantity of antenna elements of the terminal device may be used by the network device to determine an OAM physical mode supported by the terminal device. The capability information may further include an antenna aperture.

For example, the capability information may be the CSI report.

S404 and S405 are optional steps. In actual disclosure, a sequence of vortex electromagnetic waves in a plurality of OAM mode domains may be determined in another manner. For example, it may be specified in advance that the OAM physical mode domains are sequentially [1+1, −1, +2, −2, +3, . . . ].

S405 may also be omitted, and only S404 is performed. Regardless of which OAM physical modes are supported by the terminal, the network device may send the OAM test signals in a sequence determined by the network device.

Sequence of S404 and S405 may not be limited and may be exchanged. For example, if S405 is performed first, in S404, the network device may determine, based on the capability information of the terminal device in S404, the sequence of the OAM physical modes of the to-be-sent OAM test signals.

S406: The network device determines beam diffusion angles $\phi_l$ that are in different OAM physical modes l and that are of the network device.

The beam diffusion angles $\phi_l$ may be determined according to the following formula (1).

$$\phi_l = \arcsin\left(\frac{|l| \cdot \lambda}{2\pi R_t}\right) \quad (1)$$

$R_t$ is a local antenna aperture of the network device, $\lambda$ is a carrier wavelength, and the carrier wavelength $\lambda$ is related to a carrier frequency of a transmit signal.

The network device may sequentially calculate the beam diffusion angles $\phi_l$ that are of the different OAM physical modes l and that are of the network device based on the sequence of the OAM physical modes indicated by the first indication information in S404.

S407: The network device sends the vortex electromagnetic waves in the plurality of OAM physical modes to the terminal device, and the terminal device receives the vortex electromagnetic waves in the plurality of OAM physical modes from the network device.

The network device may send the vortex electromagnetic waves in the plurality of OAM physical modes in a sequence. For example, the vortex electromagnetic waves in the plurality of OAM physical modes may be sequentially sent in the sequence of the OAM physical modes indicated by the OAM mode sequence indication information in S404. Alternatively, the sequence of the OAM physical modes indicated by the OAM mode sequence indication information in S404 is denoted as a first sequence. The network device may determine, with reference to the capability information of the terminal obtained in S405, an OAM physical mode supported by the terminal in the first sequence and may determine a second sequence of the OAM physical modes, where all OAM physical modes included in the second sequence are modes supported by the terminal device. For example, if the OAM mode sequence indication information indicates that the OAM physical modes of the OAM test signals to be sent by the network device are sequentially [+1, −1, +2, −2, +3, . . . ], and the capability information of the terminal device indicates that the OAM physical modes supported by the terminal do not include [+2, −2], the network device determines that the second sequence of the OAM physical modes are sequentially [+1, −1, +3, −3, . . . ].

S408: The terminal device determines transmission parameters of the vortex electromagnetic waves in the plurality of OAM physical modes, to obtain a plurality of transmission parameters, where the plurality of transmission parameters may be in a one-to-one correspondence with the plurality of OAM physical modes.

One OAM physical mode may correspond to a plurality of types of transmission parameters. The transmission parameters of the vortex electromagnetic waves in the plurality of OAM physical modes may include any one or a combination of the following: a signal-to-noise ratio, reference signal received power, a bit error rate, a block error rate, a packet error rate, a quantity of retransmissions upon failure, or a delay of successful transmission. In this embodiment, the signal-to-noise ratio is used as an example for description. A signal-to-noise ratio of the OAM physical mode l may be denoted as $SNR_l$.

S409: The terminal device feeds back the transmission parameters of the vortex electromagnetic waves in the plurality of OAM physical modes to the network device, and the network device receives the transmission parameters that are of the vortex electromagnetic waves in the plurality of OAM physical modes and that are fed back by the terminal device.

S410: The network device sequentially sends a plurality of mixed waves to the terminal device, and the terminal device receives the plurality of mixed waves from the network device. The plurality of mixed waves may be in a one-to-one correspondence with the plurality of OAM physical modes, and any mixed wave is a mixed wave of a vortex electromagnetic wave and a plane electromagnetic wave in a corresponding OAM physical mode.

The network device may sequentially send the plurality of mixed waves to the terminal device in a sequence. The sequence may be the first sequence of the OAM physical modes indicated by the OAM mode sequence indication information in S404. Alternatively, the sequence may be the second sequence of the OAM physical modes. For details of the first sequence and the second sequence, refer to S407.

S411: The terminal device sequentially determines, from an $l^{th}$ mixed wave, a transmission parameter of a vortex electromagnetic wave in an $l^{th}$ OAM physical mode and a crosstalk coefficient $\gamma_l$ between the vortex electromagnetic wave and the reference electromagnetic wave.

Assuming that a quantity of the plurality of OAM physical modes is M, a value of l may range from 0 to (M−1), or may range from 1 to M. The terminal device may determine the crosstalk coefficient $\gamma_l$ in descending order, ascending order, or any order of values of l.

For example, the transmission parameter is the signal-to-noise ratio SNR. An SNR of the vortex electromagnetic wave in the $l^{th}$ OAM physical mode is denoted as $SNR_l^*$, and a method for calculating the crosstalk coefficient is shown in formula (2).

$$\zeta = \frac{\text{Vortex wave measurement performance}}{\text{plane wave measurement performance}} = \frac{SNR_l}{SNR_0} \quad (3)$$

In the formula (2), the vortex wave is the vortex electromagnetic wave, and the measurement performance is the transmission parameter.

S412: The terminal device feeds back a crosstalk coefficient that is of each OAM physical mode and that is determined in S411 to the network device. The terminal device may further feed back a transmission parameter that is of each OAM physical mode and that is determined in S411 to the network device. The network device receives the crosstalk coefficient from the terminal device.

For example, the terminal device feeds back, to the network device, the signal-to-noise ratio $SNR_l^*$ and the crosstalk coefficient $\gamma_l$ that are of the $l^{th}$ OAM physical mode and that are determined in S411.

S413: The network device determines a ratio between the transmission parameter of the vortex electromagnetic wave in each OAM physical mode and the transmission parameter of the reference electromagnetic wave, to obtain a plurality of ratios corresponding to the plurality of OAM physical modes.

The transmission parameter of the reference electromagnetic wave may be used as the reference value and may be determined based on the feedback signal of the terminal device in S403. For example, the reference electromagnetic wave is the plane electromagnetic wave, and the transmission parameter is the signal-to-noise ratio SNR. An SNR of the plane electromagnetic wave is denoted as $SNR_0$. $\zeta$ may be represented according to formula (3). In the formula (3), is a ratio between the $SNR_l$ of the vortex electromagnetic wave and the $SNR_0$ of the plane electromagnetic wave in the OAM physical mode l.

$$\gamma_l = \frac{1}{\text{Mixed wave measurement performance}} - \frac{1}{\text{vortex wave management performance}} = \frac{1}{SNR_l^*} - \frac{1}{SNR_l} \quad (2)$$

In the formula (3), the vortex wave is the vortex electromagnetic wave, the plane wave is the plane electromagnetic wave, and the measurement performance is the transmission parameter.

S414: The network device sorts the plurality of ratios obtained in S413, to obtain a plurality of sorting sequence numbers.

The sorting sequence numbers may be obtained according to any sorting rule. For example, the sorting rule is a combination of any one or more of descending order, ascending order, parity, modulo operation, or weighted sorting.

S415: The network device generates a plurality of OAM mode domain identifiers according to the plurality of sorting sequence numbers obtained in S414.

In this embodiment, the plurality of OAM mode domain identifiers generated by the network device may be represented in a form of a list or may be represented in another manner. In this embodiment, the form of the list is used as an example for description, and the plurality of OAM mode domain identifiers are represented by using an OAM mode domain identifier list. When the OAM mode domain identifier list is related, it is intended to express a plurality of OAM mode domain identifiers generated by the network device by interacting with the terminal device. The plurality of OAM mode domain identifiers may correspond to a plurality of same or different quantities of OAM physical modes. The plurality of OAM physical modes may be supported by the terminal device, or supported by the network device, or supported by both the network device and the terminal device. The OAM mode domain identifier list may be generated online or stored in advance.

The plurality of OAM mode domain identifiers may be in a one-to-one correspondence with the plurality of sorting sequence numbers, the plurality of sorting sequence numbers may be in a one-to-one correspondence with the plurality of ratios $\zeta$, and the plurality of ratios $\zeta$ are in a one-to-one correspondence with the plurality of OAM physical modes. The OAM mode domain identifier may be considered as a sequence number of sorting, and may be a natural number, for example, 0, 1, 2, 3. The OAM mode domain identifier may also be considered as a ratio $\zeta$ and a value of the ratio $\zeta$ may be an integer or a fraction, or an integer value or a floating point value. It can be understood that the OAM mode domain identifier is not directly represented as an OAM physical mode but reflects channel performance of a vortex electromagnetic wave in the OAM physical mode and corresponds to a transmission parameter of the vortex electromagnetic wave in the OAM physical mode.

When the ratios $\zeta$ are sorted, if ratios $\zeta$ are equal, a plurality of equal ratios may be randomly sorted, or may be sorted according to a rule in which a smaller number of OAM physical modes corresponding to the ratios is ranked top, may be sorted according to a rule in which a positive number is ranked in front of a negative number, or may be sorted according to a combination thereof.

In this embodiment, one OAM mode domain identifier may correspond to one or more OAM physical modes. When ratios ζ are equal, if a plurality of equal ratios ζ are sorted according to a set rule, it can be ensured that one OAM mode domain identifier corresponds to one OAM physical mode. Optionally, the plurality of equal ratios may correspond to a same sorting sequence number, that is, correspond to a same OAM mode domain identifier. In this way, one OAM mode domain identifier corresponds to a plurality of OAM physical modes. In any case, using the OAM mode domain identifier does not reduce a quantity of available OAM physical modes.

The OAM mode domain identifier is represented by a letter m, m=[1, 2, 3, . . . ], or m=[0, 1, 2, 3, . . . ]. An OAM mode domain identifier 0 may correspond to the plane electromagnetic wave.

For example, a correspondence between the logical OAM identifier m and the OAM physical mode is shown in Table 2. Table 2 does not show a sequence number 0, and the sequence number 0 may be the plane electromagnetic wave.

TABLE 2

| OAM mode domain identifier m | OAM physical mode ι |
|---|---|
| 1 | $ι_1, ι_4$ |
| 2 | $ι_2$ |
| 3 | $ι_3$ |
| . . . | . . . |

The plurality of OAM mode domain identifiers may also be referred to as a plurality of OAM mode domain ports. One OAM mode domain identifier may correspond to one or more OAM physical modes. For example, in a column of logical OAM identifier sequence numbers shown in Table 2, for OAM physical modes $ι_1$ and $ι_4$, no matter what physical means are used, for example, regardless of whether same or different transmit power is allocated to the OAM physical modes $ι_1$ and $ι_2$, same or different antenna arrays are used, and same or different propagation paths are used, as long as a same OAM mode domain identifier m corresponding to the two OAM physical modes $ι_1$ and $ι_4$ is equal to 1, $ι_1$ are $ι_4$ considered to belong to a same OAM mode domain identifier or OAM mode domain port.

Optionally, the network device may further establish a correspondence between the OAM mode domain identifier m and a beam diffusion angle $ϕ_m$, or may further establish a correspondence between the OAM mode domain identifier m and a crosstalk coefficient $γ_m$, or simultaneously establish a correspondence between the OAM mode domain identifier m and both a beam diffusion angle $ϕ_m$ and a crosstalk coefficient $γ_m$. By establishing the correspondence, some features of the OAM mode domain identifier m may be represented by using the crosstalk coefficient $γ_m$ and/or the crosstalk coefficient $γ_m$.

For example, a correspondence among the logical OAM identifier m, the beam diffusion angle, the crosstalk coefficient, and the OAM physical mode is shown in Table 3. A sequence number 0 may represent the plane electromagnetic wave, and the sequence number 0 is not shown in Table 3.

TABLE 3

| OAM mode domain identifier m | Beam diffusion angle ϕ | Crosstalk coefficient γ | OAM physical mode ι |
|---|---|---|---|
| 1 | $ϕ_1$ | $γ_1$ | $ι_1, ι_4$ |
| 2 | $ϕ_2$ | $γ_2$ | $ι_2$ |
| 3 | $ϕ_3$ | $γ_3$ | $ι_3$ |
| . . . | . . . | . . . | . . . |

The plurality of OAM mode domain identifiers may also be referred to as a plurality of OAM mode domain ports. One OAM mode domain identifier may correspond to one or more OAM physical modes. In a column of logical OAM identifier sequence numbers shown in Table 3, for OAM physical modes $ι_1$ and $ι_4$, no matter what physical means are used, for example, regardless of whether same or different transmit power is allocated to the OAM physical modes $ι_1$ and $ι_4$, same or different antenna arrays are used, and same or different propagation paths are used, as long as the two OAM physical modes $ι_1$ and $ι_4$ correspond to a same OAM mode domain identifier m, beam diffusion angle $ϕ$, and crosstalk coefficient $γ$ or as long as errors between OAM physical modes m, between beam diffusion angles $ϕ$, and between crosstalk coefficients $γ$ obtained in the two OAM physical mode $ι_1$ and $ι_2$ each is less than an acceptable threshold, $ι_1$ and $ι_2$ are considered to belong to a same OAM mode domain identifier or OAM mode domain port.

S406 is an optional step. If S406 is omitted, the network device may not establish the correspondence between the OAM mode domain identifier m and the beam diffusion angle $ϕ_m$. For example, the network device may establish only the correspondence between the OAM mode domain identifier m and the crosstalk coefficient $γ_m$.

S410 to S412 are a process of obtaining the crosstalk coefficient $γ_l$, and are optional steps, or may be omitted. If S410 to S412 are omitted, the network device may not establish the correspondence between the OAM mode domain identifier m and the crosstalk coefficient $γ_m$. For example, the network device may establish only the correspondence between the OAM mode domain identifier m and the beam diffusion angle $ϕ_m$.

Alternatively, S406 may be omitted, and S410 to S412 may also be omitted.

S413 to S415 are a process of generating the plurality of OAM mode domain identifiers. In a possible implementation, the network device may directly sort the transmission parameters of the vortex electromagnetic waves in the plurality of OAM physical modes to obtain the plurality of sorting sequence numbers and may generate the plurality of OAM mode domain identifiers according to the plurality of sorting sequence numbers. The transmission parameters of the vortex electromagnetic waves in the plurality of OAM physical modes may also be sorted according to any sorting rule, for example, according to any one or a combination of the following rules: descending order, ascending order, parity, modulo operation, or weighted sorting. In this way, a process of obtaining the transmission parameter of the reference electromagnetic wave in S401 to S403 may be omitted. Based on this simpler manner of obtaining the OAM mode domain identifier, the manner of obtaining the OAM mode domain identifier according to S413 to S415 can refer to the reference electromagnetic wave, and a result is more accurate.

In this embodiment, the OAM mode domain identifier may be an integer, for example, ±1, ±2, . . . , or may be a fraction or a decimal, for example, +1.25, −3.5. The OAM mode domain identifier can be mapped to a fractional OAM mode. Therefore, the OAM mode domain identifier in this embodiment is more flexible. In addition, this embodiment may not require that antenna array specifications of a transmit end and a receive end be the same and may be applied to a scenario in which the antenna array specifications of the transmit end and the receive end are different. This embodiment also does not require that antenna array specifications of different OAM modes be the same and may be applied to a scenario in which the antenna array specifications of the different OAM modes are different. This embodiment is more universal and flexible.

In conclusion, the OAM mode domain identifier in this embodiment can avoid impact of the physical antenna array and the physical OAM mode on logic of the higher layer communication protocol. In addition, measurement performance represented by a signal-to-noise ratio is used for calculation, and a converted logical mode is used as a scheduling reference. This greatly improves universality and flexibility of a scheduling algorithm.

It should be noted that FIG. 4 describes an example of the method for determining the OAM mode domain identifier by the network device. In actual disclosure, the network device may generate the OAM mode domain identifier online or may pre-generate the OAM mode domain identifier and store the OAM mode domain identifier locally. The network device may query the pre-stored OAM mode domain identifier to determine to send OAM mode domain information to the terminal.

Based on the embodiment in FIG. 4, the following further describes in detail, by using a disclosure scenario 1, the method for determining the OAM mode domain identifier by the network device. In this disclosure scenario, the reference electromagnetic wave is a plane electromagnetic wave, and the transmission parameter is a signal-to-noise ratio.

Figure 5:
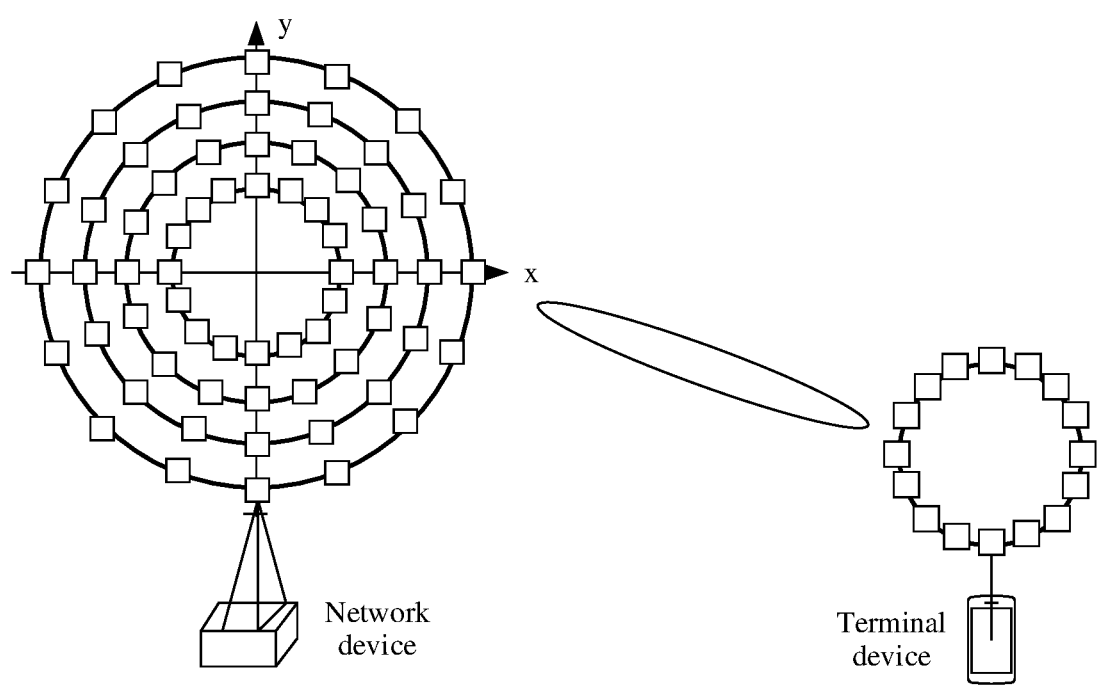
FIG. 5 is a schematic diagram of antenna arrays of a network device and a terminal device according to an embodiment.

As shown in FIG. 5, it is assumed that an antenna array of the network device is deployed in four circles in a concentric manner, 16 antenna elements in each circle are arranged at an equal spacing, and only 16 antenna elements in one circle are installed on the terminal device. Radius of the concentric circles of the network device from the inside to the outside are sequentially denoted as $R_1$ and $R_2$, $R_3$, and $R_4$. Four OAM physical modes set to be used by the network device are respectively +1, +3, +5, and +7. It is specified that innermost circle antenna elements send the OAM physical mode +1, and innermost circle antenna elements sequentially send the OAM physical modes +3, +5, and +7. Both the network device and the terminal device perform communication by using a radio wave in a 28 GHz frequency band, and a corresponding wavelength is 2=1 cm. There may be a line of sight (LOS) path channel between the network device and the terminal device.

Figure 6:
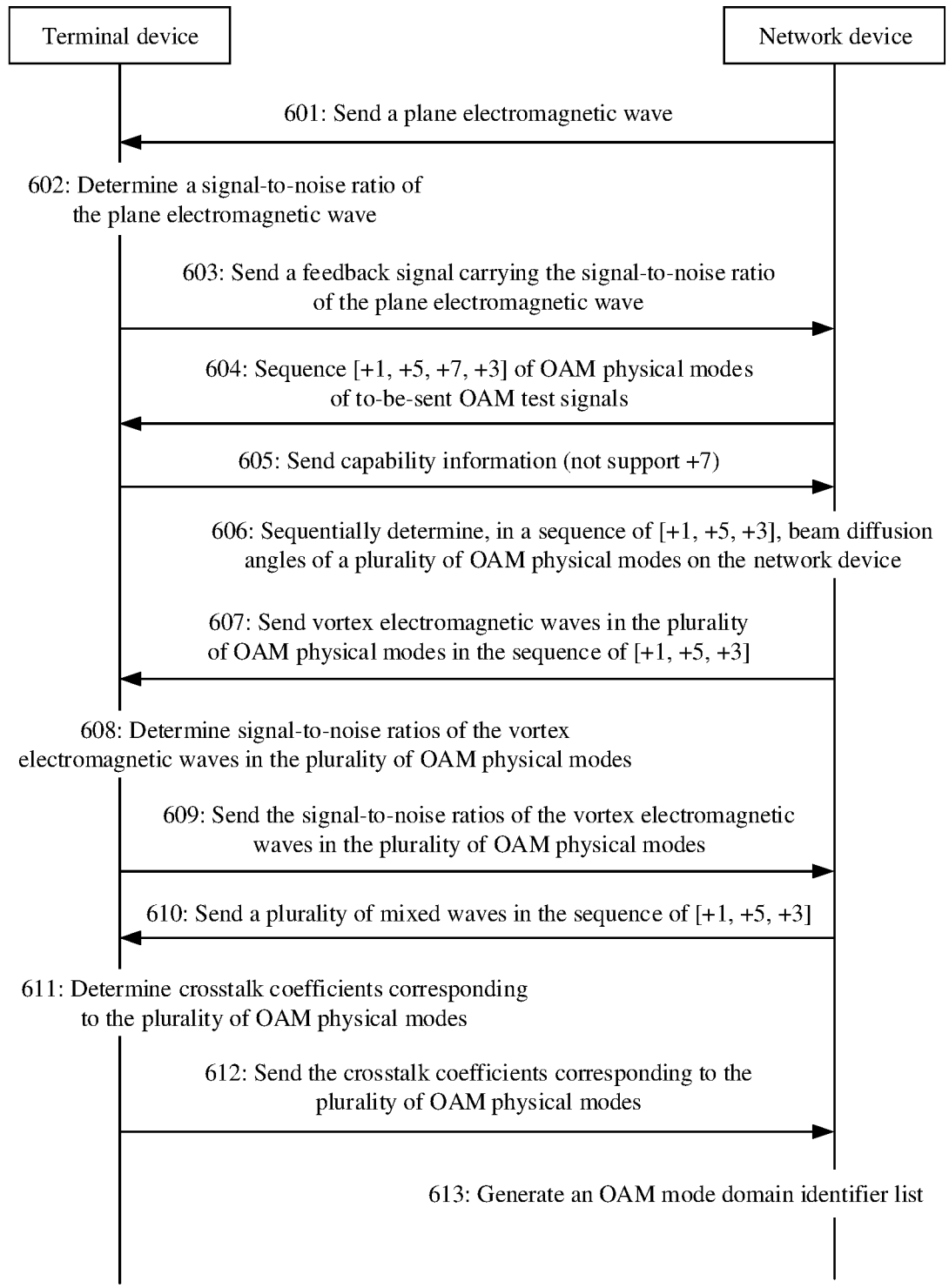
FIG. 6 is a second schematic flowchart of a method for determining an OAM mode domain identifier by a network device according to an embodiment.

As shown in FIG. 6, based on the antenna array in FIG. 5, a procedure of the method for determining the OAM mode domain identifier by the network device is as follows:

S601: The network device sends a plane electromagnetic wave signal $S_0$ to the terminal device at power $P_0$ by using the innermost cycle antenna elements, and the terminal device receives the plane electromagnetic wave signal $S_0$.

S602: The terminal device determines a signal-to-noise ratio $SNR_0$ of the plane electromagnetic wave signal $S_0$.

The terminal device may further determine an angle of arrival $DOA_0$ of the plane electromagnetic wave signal $S_0$.

S603: The terminal device sends, to the network device, a feedback signal carrying the signal-to-noise ratio information $SNR_0$, and the network device receives the feedback signal from the terminal device and records the signal-to-noise ratio information that is of the plane electromagnetic wave and that is carried in the feedback signal.

The feedback signal may further carry the angle of arrival $DOA_0$. The network device may further record information about the angle of arrival.

S604: The network device sends, to the terminal device by using the plane electromagnetic wave, a sequence [+1, +5, +7, +3] of OAM physical modes of OAM test signals to be sent by the network device.

It may be understood that the sequence of the OAM physical modes herein is not necessarily ascending or descending and may also be out of order.

S605: After receiving information about the sequence of the OAM physical modes, the terminal device feeds back an acknowledgment message to the network device, and reports capability information of the terminal device. The network device receives the capability information from the terminal device.

The capability information of the terminal device herein may include: a quantity of antenna elements of the terminal device or an OAM physical mode that is supported to be received and sent by the terminal device. The capability information may further include an antenna aperture.

For example, assuming that the terminal device supports only OAM physical modes [+1, +3, +5], the acknowledgment message fed back by the terminal device to the network device may indicate that the capability of the terminal device is [+1, +5, N/A, +3].

After receiving the capability information, the network device sequentially sends OAM test signals of the OAM physical modes of [+1, +5, +3] in the following procedure, and removes the +7 mode.

S606: The network device sequentially calculates local beam diffusion angles $\phi_{+1}$, $\phi_{+5}$, and $\phi_{+3}$ that are of different OAM physical modes in a sequence of [+1, +5, +3].

According to the foregoing mapping relationship between the mode and the transmit inner and outer circles and the foregoing formula (1), $$\phi_{+1} = \arcsin\left(\frac{1 \cdot \lambda}{2\pi R_1}\right), \phi_{+5} = \arcsin\left(\frac{5 \cdot \lambda}{2\pi R_3}\right), \text{ and } \phi_{+3} = \arcsin\left(\frac{3 \cdot \lambda}{2\pi R_2}\right).$$

S607: The network device sequentially sends vortex electromagnetic waves in the different OAM physical modes to the terminal device in the sequence of [+1, +5, +3], and the terminal device receives the plurality of vortex electromagnetic waves from the network device.

S608: The terminal device determines signal-to-noise ratios of the vortex electromagnetic waves in the plurality of OAM physical modes.

The terminal device sequentially detects a signal-to-noise ratio $SNR_l$ of a vortex electromagnetic wave in an $l^{th}$ OAM physical mode in a classical $e^{-jl\varphi}$ inverse phase gradient method.

S609: The terminal device feeds back, to the network device, the signal-to-noise ratio $SNR_l$ corresponding to each OAM physical mode. The network device receives, from the terminal device, the signal-to-noise ratio $SNR_l$ corresponding to each OAM physical mode.

If angles of arrival DOAs at which vortex electromagnetic waves of the network device arrive at different terminal devices are different, different signal-to-noise ratios are detected in the different terminal devices even if a same OAM physical mode is used.

S610: The network device sequentially sends the vortex electromagnetic waves in the different OAM physical modes to the terminal device in the sequence of [+1, +5, +3] by using antenna elements and power $P_0$ in corresponding circles, and sends a plane electromagnetic wave $S_0$ by using the innermost circle antenna elements and the same power $P_0$ when sending a vortex electromagnetic wave in each OAM physical mode. The vortex electromagnetic wave and the plane electromagnetic wave in each OAM physical mode form a mixed wave. The terminal device receives a plurality of mixed waves from the network device.

For example, a vortex electromagnetic wave whose physical mode is +1 is denoted as $S_{+1}$, and a corresponding mixed wave is $\tilde{S} = S_{+1} + S_0$.

S611: The terminal device sequentially extracts and detects signal-to-noise ratios $SNR_l$ of the different OAM physical modes from the mixed waves $\tilde{S}$, and calculates a crosstalk coefficient $\gamma_l$ between a vortex electromagnetic wave and a plane electromagnetic wave in the physical mode according to the formula (2).

S612: The terminal device feeds back, to the network device, a signal-to-noise ratio $SNR_l^*$ and a crosstalk coefficient $\gamma_l$ that correspond to each OAM physical mode.

S613: The network device generates an OAM mode domain identifier list, where the list includes a plurality of entries, and each entry corresponds to one OAM mode domain identifier, one crosstalk coefficient, and one beam diffusion angle.

Optionally, in a manner 1, the OAM mode domain identifier is generated by using a relative SNR. That is, sorting is performed according to a value of a ratio $\zeta$ between the signal-to-noise ratio of the vortex electromagnetic wave and the signal-to-noise ratio of the plane electromagnetic wave in the OAM physical mode. A method for calculating the ratio $\zeta$ is shown in the formula (3). The plane electromagnetic wave is denoted as a start sequence number 0, and sorting is performed in descending order of the ratio $\zeta$. Optionally, in another manner 2, the OAM mode domain identifier is generated by using an absolute SNR. Sorting is performed according to a value of the signal-to-noise ratio of the vortex electromagnetic wave in the OAM physical mode, and the OAM mode domain identifier is generated based on a sorting result.

Regardless of the manner 1 or the manner 2, assuming that the sorting result is $\zeta_{+1} > \zeta_{+5} > \zeta_{+3}$, the OAM mode domain identifier is generated in ascending order from the start sequence number. A beam diffusion angle and a crosstalk coefficient that correspond to each OAM mode domain identifier are established, and finally generated logical OAM identifier sequence numbers are shown in Table 4. Table 4 does not show a sequence number 0, and the sequence number 0 may be the plane electromagnetic wave.

TABLE 4

| OAM mode domain identifier m | Beam diffusion angle $\phi$ | Crosstalk coefficient $\gamma$ | OAM physical mode $l$ |
|---|---|---|---|
| 1 | $\phi_{+1}$ | $\gamma_{+1}$ | +1 |
| 2 | $\phi_{+5}$ | $\gamma_{+5}$ | +5 |
| 3 | $\phi_{+3}$ | $\gamma_{+3}$ | +3 |
| ... | ... | ... | ... |

In this embodiment, one OAM mode domain identifier may correspond to one or more OAM physical modes. It is assumed that one OAM mode domain identifier corresponds to a plurality of OAM physical modes.

In a column of logical OAM identifier sequence numbers shown in Table 2, for any two OAM physical modes $l_1$ and $l_2$, no matter what physical means are used, for example, regardless of whether same or different transmit power is allocated to the OAM physical modes $l_1$ and $l_2$, same or different antenna arrays are used, and same or different propagation paths are used, as long as the two OAM physical modes $l_1$ and $l_2$ correspond to a same OAM mode domain identifier m, beam diffusion angle $\phi$, and crosstalk coefficient $\gamma$ or as long as errors between OAM physical modes m, between beam diffusion angles $\phi$, and between crosstalk coefficients $\gamma$ obtained in the any two OAM physical modes $l_1$ and $l_2$ each is less than an acceptable threshold, $l_1$ and $l_2$ are considered to belong to a same OAM mode domain identifier or OAM mode domain port.

Based on the embodiment in FIG. 4, the following further describes in detail, by using a disclosure scenario 2, the method for determining the OAM mode domain identifier by the network device. In this disclosure scenario, the reference electromagnetic wave is a plane electromagnetic wave, and the transmission parameter is a signal-to-noise ratio.

Figure 7:
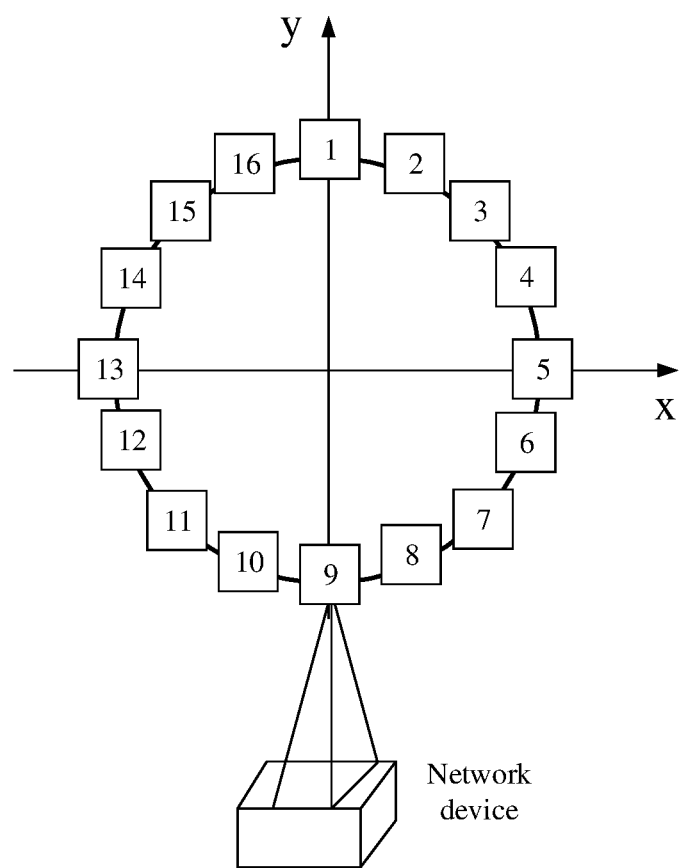
FIG. 7 is a schematic diagram of an antenna array of a network device according to an embodiment.

As shown in FIG. 7, it is assumed that an antenna array of the network device is deployed in one circle, N antenna elements are deployed in each circle, a value of N is 16, and 16 antenna elements are arranged in each circle at an equal spacing.

The network device may generate an OAM vortex electromagnetic wave in a manner of the following formula (4).

$$x(t) = \sum_{n=0}^{N-1} p_n \cdot s_0(t) \cdot e^{j2\pi l \frac{n}{N}} \quad (4)$$

$p_n$ represents power allocated to an $n^{th}$ antenna element, $s_0(t)$ is a to-be-sent signal carried by the plane electromagnetic wave, l is a quantity of OAM physical modes, $x(t)$ is a generated vortex electromagnetic wave signal of an $l^{th}$ OAM physical mode, and N is a quantity of antenna elements in each circle.

A value of l may be an integer, may be a fraction, or may be a decimal. For example, l=+5/4. For. For another example, l=−9/5. The vortex electromagnetic wave may be generated by substituting a value of l being a fraction into the formula (4). Compared with a value of l being an integer, a value of l being a fraction may improve a capability of resisting wireless multipath channel effect.

In some technologies, an OAM physical mode is directly used as an OAM index to identify a radio resource. These technologies either do not support an OAM physical mode in a fractional form or may mix an OAM physical mode in a fractional form with an OAM physical mode in an integer form to identify a radio resource. The OAM mode domain identifier provided in this embodiment can support the OAM physical mode in the fractional form.

Figure 8:
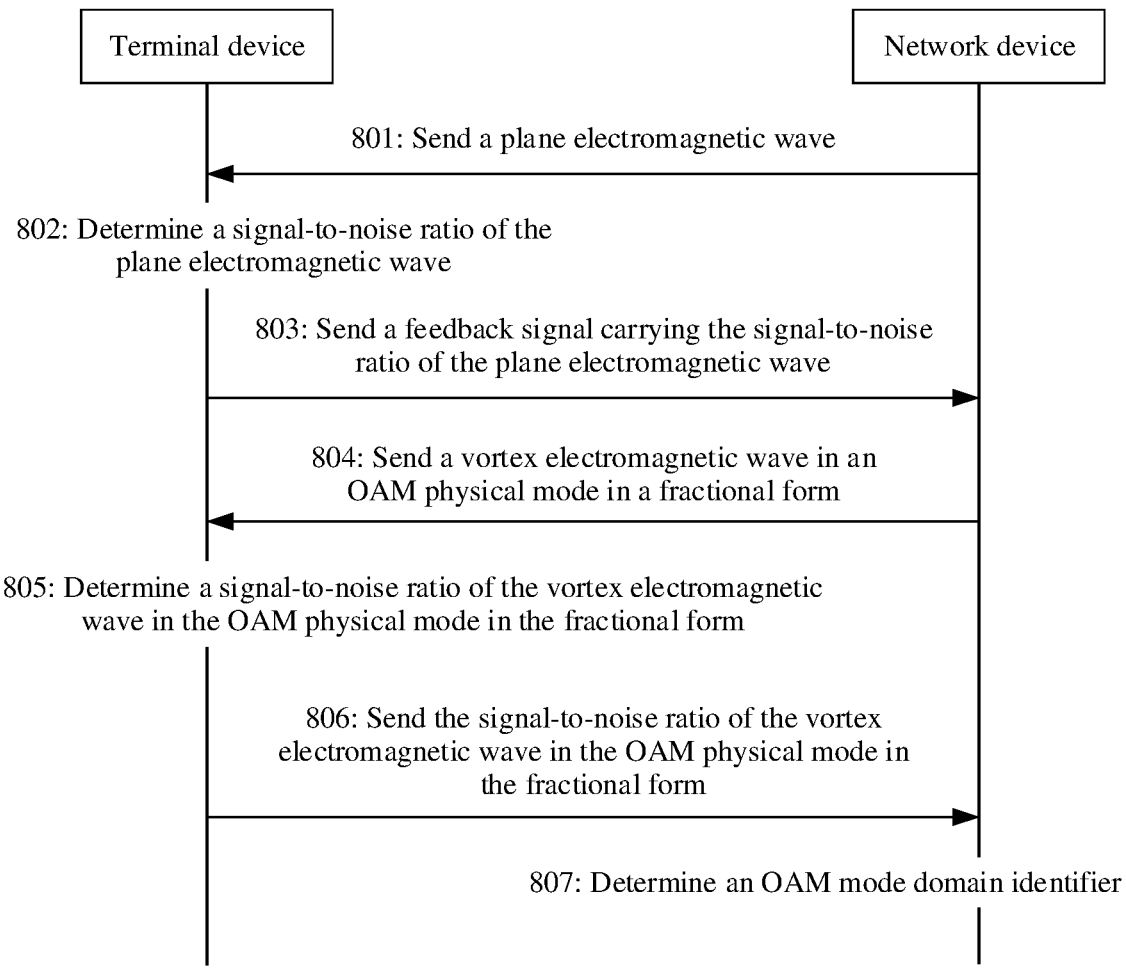
FIG. 8 is a third schematic flowchart of a method for determining an OAM mode domain identifier by a network device according to an embodiment.

As shown in FIG. 8, based on the antenna array in FIG. 7, a procedure of the method for determining the OAM mode domain identifier by the network device is as follows:

S801: The network device sends a plane electromagnetic wave signal $S_0$ to the terminal device at power $P_0$, and the terminal device receives the plane electromagnetic wave signal $S_0$ from the network device.

S802: The terminal device determines a signal-to-noise ratio $SNR_0$ of the plane electromagnetic wave signal $S_0$.

The terminal device may further determine an angle of arrival $DOA_0$ of the plane electromagnetic wave signal $S_0$.

S803: The terminal device sends, to the network device, a feedback signal carrying the signal-to-noise ratio information $SNR_0$, and the network device receives the feedback signal from the terminal device and records the signal-to-noise ratio information that is of the plane electromagnetic wave and that is carried in the feedback signal.

The feedback signal may further carry the angle of arrival $DOA_0$. The network device may further record information about the angle of arrival.

S804: The network device sends a vortex electromagnetic wave in an OAM physical mode l in a fractional form to the terminal device at power $P_0$, and the terminal device receives the vortex electromagnetic wave in the OAM physical mode l in the fractional form from the network device.

S805: The terminal device determines a signal-to-noise ratio of the vortex electromagnetic wave in the OAM physical mode l in the fractional form.

The terminal device sequentially detects a signal-to-noise ratio $SNR_l$ of a vortex electromagnetic wave in an $l^{th}$ OAM physical mode in a classical $e^{-jl\varphi}$ inverse phase gradient method.

S806: The terminal device sends the signal-to-noise ratio of the vortex electromagnetic wave in the OAM physical mode l in the fractional form to the network device, and the network device receives the signal-to-noise ratio of the vortex electromagnetic wave in the OAM physical mode l from the terminal device.

S807: The network device determines the OAM mode domain identifier.

Similar to S613, in an optional implementation 1, sorting is performed according to a ratio $\zeta=SNR_l/SNR_0$ between signal-to-noise ratios to obtain the OAM mode domain identifier; and in another manner 2, the OAM mode domain identifier is generated by using an absolute SNR. Sorting is performed according to a value of the signal-to-noise ratio of the vortex electromagnetic wave in the OAM physical mode l in the fractional form, and the OAM mode domain identifier is generated based on a sorting result.

In this embodiment of this disclosure, a beam diffusion angle and a crosstalk coefficient that correspond to each OAM mode domain identifier may be determined with reference to the method in the embodiment shown in FIG. 6. Repeated parts are not described again.

It should be noted that a difference between the embodiment in FIG. 8 and the embodiment in FIG. 6 lies in that numerical types of the OAM physical mode are different. Mutual reference may be made between the steps, and repeated parts are not described again.

The OAM mode domain identifier determined based on the OAM physical mode in the fractional form may be compared and sorted with an OAM mode domain identifier determined based on an OAM physical mode in an integer form, to finally obtain a unified OAM mode domain identifier, for example, to finally obtain a unified OAM mode domain identifier sequence number table.

It may be understood that the OAM physical mode in the fractional form and the OAM physical mode in the integer form may correspond to a same OAM mode domain identifier.

In this embodiment, the OAM mode domain identifier is converted based on the OAM physical mode. The OAM physical mode may support the integer form and the fractional form. In this way, a unified and universal method for identifying a mode domain identifier can be obtained, and a schedulable range of a wireless scheduling algorithm in OAM mode domain is increased. If the OAM physical modes in the fractional form and the OAM physical modes in the integer form are combined for comparison and sorting, impact of hardware factors such as a physical antenna array and a value form of the OAM physical mode on the mode domain identifier can be avoided.

The foregoing describes, by using FIG. 4 to FIG. 8, possible implementations in which the network device determines the OAM mode domain identifier. The network device may determine a plurality of OAM mode domain identifiers. For example, the network device determines an OAM mode domain identifier list. The following describes optional implementations of how the network device determines, from the plurality of OAM mode domain identifiers, a first OAM mode domain identifier to be sent to the terminal device.

When the network device allocates a radio resource to the terminal device, the radio resource includes OAM mode domain. The network device may send OAM mode domain information to the terminal device, and indicate, by using the OAM mode domain information, the radio resource allocated to the terminal device.

A process in which the network device determines the first OAM mode domain identifier may be understood as a process of determining the radio resource allocated to the terminal. The network device may allocate the radio resource to the terminal device according to the following allocation rule.

(1) For data of different priorities of a same terminal device, a higher priority indicates a lower OAM mode domain identifier corresponding to the allocated radio resource.

(2) For a plurality of terminal devices, each terminal device may determine a plurality of OAM mode domain identifiers, the plurality of OAM mode domain identifiers may be a list, a set, or another representation form, and an OAM mode domain identifier list is used as an example. When a radio resource is allocated to a terminal device, a resource with a lower OAM mode domain identifier in an OAM mode domain identifier list corresponding to the terminal device is preferably selected. When resources corresponding to OAM mode domain identifiers preferably selected by a plurality of terminal devices are the same, a terminal device with a lower priority sequentially postpones a sequence number of an OAM mode domain identifier until a corresponding different resource is found. The resource herein may be an OAM physical mode. For example, an OAM mode domain identifier 1 in an OAM mode domain identifier list 1 is selected for a terminal device 1, and an OAM mode domain identifier 2 in an OAM mode domain identifier list 2 is selected for terminal device 2. The OAM mode domain identifier 1 and the OAM mode domain identifier 2 correspond to a same OAM physical mode, and a priority of the terminal device 2 is lower than that of the terminal device 1. In this case, an OAM mode domain identifier 3, an OAM mode domain identifier 4, . . . , that are sequentially higher than the OAM mode domain identifier 2 and that are in the OAM mode domain identifier list 2 each are selected for the terminal device 2 until an OAM physical mode corresponding to the selected OAM mode domain identifier is different from the OAM physical mode corresponding to the OAM mode domain identifier 1, so that an OAM physical mode corresponding to the OAM mode domain identifier is selected as a resource of the terminal device 2.

(3) If priorities of to-be-sent data are the same, resources may be allocated layer by layer according to sequence numbers in ascending order of the OAM mode domain identifiers until the to-be-sent data is allocated or all resources used by the OAM at the current layer are allocated. For example, starting from a minimum sequence number of the OAM mode domain identifier, a water filling algorithm is performed layer by layer on a time-frequency two-dimensional resource at each layer in ascending order of sequence numbers of the OAM mode domain identifiers until all to-be-sent data is allocated or all available time-frequency resources at the current layer are allocated. One OAM mode domain identifier corresponds to one layer. It should be noted that the OAM mode domain identifier at each layer does not refer to a normal OAM physical mode.

In a process of allocating OAM mode domain identifiers at a next layer, crosstalk factors of OAM mode domain identifiers of all layers that have been allocated to the OAM mode domain identifiers at the next layer are considered as interference noise that needs to be considered during OAM power allocation at the next layer, and a quantity of time-frequency resources and transmit power required by a to-be-sent data stream are calculated until all to-be-sent data is allocated or all available time-frequency resources of the next layer are allocated. If there is still to-be-sent data, go to OAM mode domain identifiers at a next layer. The crosstalk factor is $\gamma$ mentioned in the embodiment in FIG. 4 or a variant form of $\gamma$ obtained through secondary calculation.

System modeling is based on the following input condition, optimization objective, and constraint.

Input condition: There are N to-be-sent data streams, and a transmission rate and allocated power required by each data stream are respectively denoted as $R_n$ and $p_n$, $n \in [1, N]$. A system schedulable resource set is $(f, t, m)_{\rho,\mu}$, where $f \in [1, F]$ is a frequency domain identifier index, $t \in [1, T]$ is a time domain identifier index, and $m \in [1, M]$ is a mode domain identifier index. Total power allowed by the system is $P_{total}$.

Optimization objective: $\max\limits_{p_n^*, \delta_{n,f,t,m}^*} C = \sum_{n=1}^{N} \log_2\left(1 + \frac{h_{n,f,t,m} \cdot \delta_{n,f,t,m} \cdot p_n}{N_0}\right)$.

Constraint: $\sum p_n \leq P_{total}$.

$p_n \geq 0, n = 1, 2, \ldots, N$ $\delta_{n,f,t,m} = \begin{cases} 1, & \text{if } (f, t, m) \text{ resources are allocated to an } n^{th} \text{ data stream} \\ 0, & \text{others} \end{cases}$ $h_{n,f,t,m}$ represents channel quality of an $n^{th}$ data stream in an $m^{th}$ logical OAM mode at an $f^{th}$ frequency and in a $t^{th}$ slot, $\delta_{n,f,t,m}$ is an identifier indicating whether a resource element of the $m^{th}$ logical OAM mode identifier at the $f^{th}$ frequency point and in the $t^{th}$ slot is allocated to the $n^{th}$ data stream, and $N_0$ is white Gaussian noise power.

The radio resource may be used for uplink transmission or downlink transmission. The following separately describes, for uplink transmission and downlink transmission, optional implementations in which the network device allocates a radio resource having OAM mode domain to the terminal device.

Case 1: The network device allocates a radio resource having OAM mode domain to the terminal device, where the radio resource is used for downlink transmission.

In S302, the OAM mode domain information sent by the network device to the terminal device may be carried in downlink control information (DCI). The network device may further send a plurality of OAM mode domain identifiers to the terminal device. For example, the plurality of OAM mode domain identifiers may be represented in a form of a list, and the network device sends the OAM mode domain identifier list to the terminal device. The plurality of OAM mode domain identifiers may be determined by the network device based on a plurality of OAM physical mode domains and may be determined according to the embodiment in FIG. 4.

Assuming that the plurality of OAM physical modes are [+1, +3, +5], the plurality of OAM mode domain identifiers respectively corresponding to the plurality of OAM mode domain identifiers are [1, 3, 2], and a first OAM mode domain identifier corresponding to a downlink resource allocated by the network device to the terminal device is 2, the network device sends, to the terminal device, DCI that carries the first OAM mode domain identifier being 2, and sends a list of the plurality of OAM mode domain identifiers to the terminal device. Optionally, the network device sends [2, 1, 3, 2] to the terminal device, to indicate that the first OAM mode domain identifier is 2 and the plurality of OAM mode domain identifiers are [1, 3, 2].

Both the first OAM mode domain identifier and the OAM mode domain identifier list may be carried in the DCI or may be separately indicated by being carried in different messages. For example, the network device may indicate a resource to the terminal device by using the DCI, and the network device adds an OAM mode domain identifier list to the resource indicated by the DCI. The terminal device obtains the OAM mode domain identifier list on the resource indicated by the DCI.

Optionally, in this embodiment, the first OAM mode domain identifier may be one of the plurality of OAM mode domain identifiers, or the first OAM mode domain identifier may be several of the plurality of OAM mode domain identifiers. The OAM mode domain information may indicate a single value or may indicate a value range in the plurality of OAM mode domain identifiers. The value range may be embodied by indicating a minimum value and a maximum value. For example, the plurality of OAM physical modes may be [+1, +3, +5], and a plurality of corresponding OAM mode domain identifiers are [1, 3, 2]. The OAM mode domain information may indicate [2], indicating that the first OAM mode domain identifier is [2] in [1, 3, 2]. The OAM mode domain information may also indicate that the minimum value is 1 and the maximum value is 3 or may indicate that the value range is 1 to 3, indicating that the first OAM mode domain identifier may be [1], [2], or [3] in [1, 3, 2].

When the network device indicates the first OAM mode domain identifier, it means that the network device may send downlink data to the terminal device on the radio resource indicated by the first OAM mode domain identifier, and the terminal device may receive the downlink data based on the radio resource indicated by the first OAM mode domain identifier. For example, the first OAM mode domain identifier is [2] in [1, 3, 2], the network device sends downlink data to the terminal device on a radio resource whose OAM mode domain identifier is [2], and the terminal device may receive the downlink data based on the radio resource indicated by the OAM mode domain identifier being [2]. For another example, the first OAM mode domain identifier is [1], [2], or [3] in [1, 3, 2]. The network device sends downlink data to the terminal device on a radio resource whose OAM mode domain identifier is [1], [2], or [3]. The terminal device may receive the downlink data based on the radio resource indicated by the OAM mode domain identifier [1], [2], or [3].

After receiving the downlink data, the terminal device may send a response message of the downlink data to the network device. The response message may be a positive acknowledgement (ACK) instruction or a negative acknowledgement (NACK) instruction. The ACK indicates that the downlink data is received. The NACK indicates that retransmission is required. If the network device determines, based on that the response message is the NACK, that retransmission is required, the network device sends the OAM mode domain information to the terminal again, and sends the downlink data. The OAM mode domain information may be the same as or different from that sent last time.

Case 2: The network device allocates a radio resource having OAM mode domain to the terminal device, where the radio resource is used for uplink transmission.

In S302, the OAM mode domain information sent by the network device to the terminal device may be carried in an uplink scheduling grant (UL-Grant). The network device may further send a plurality of OAM mode domain identifiers to the terminal device. For example, the plurality of OAM mode domain identifiers may be represented in a form of a list, and the network device sends the OAM mode domain identifier list to the terminal device. The plurality of OAM mode domain identifiers may be determined by the network device based on a plurality of OAM physical mode domains and may be determined according to the embodiment in FIG. 4.

When the radio resource is used for uplink transmission, the terminal device sends a plurality of test signals to the network device. Assuming that a plurality of OAM physical modes corresponding to the plurality of test signals sent by the terminal are [+1, +5, +7, +3], OAM physical modes supported by the network device are [+1, +5, N/A, +3], where N/A indicates not supported. The plurality of OAM physical modes being [+1, +5, N/A, +3] respectively correspond to the plurality of OAM mode domain identifiers being [1, 3, N/A, 2]. If a first OAM mode domain identifier corresponding to an uplink resource allocated by the network device to the terminal device is 2, the network device sends, to the terminal device, UL-Grant that carries the first OAM mode domain identifier being 2 and sends a list of the plurality of OAM mode domain identifiers to the terminal device. Optionally, the network device sends [2, 1, 3 N/A, 2] to the terminal device, to indicate that the first OAM mode domain identifier is 2 and the plurality of OAM mode domain identifiers are [1, 3, N/A, 2].

Both the first OAM mode domain identifier and the list of the plurality of OAM mode domain identifiers may be carried in the UL-Grant or may be separately indicated by being carried in different messages.

Optionally, in this embodiment, the first OAM mode domain identifier may be one of the plurality of OAM mode domain identifiers, or the first OAM mode domain identifier may be several of the plurality of OAM mode domain identifiers. The OAM mode domain information may indicate a single value or may indicate a value range in the plurality of OAM mode domain identifiers. The value range may be embodied by indicating a minimum value and a maximum value. For example, the plurality of OAM physical modes may be [+1, +5, N/A, +3], and a plurality of corresponding OAM mode domain identifiers may be [1, 3, N/A, 2]. The OAM mode domain information may indicate [2], indicating that the first OAM mode domain identifier is [2] in [1, 3, N/A, 2]. The OAM mode domain information may also indicate that the minimum value is 1 and the maximum value is 3 or may indicate that the value range is 1 to 3, indicating that the first OAM mode domain identifier may be [1], [2], or [3] in [1, 3, 2].

When the network device indicates the first OAM mode domain identifier, it means that the uplink resource allocated by the network device to the terminal device is the radio resource indicated by the first OAM mode domain identifier. The terminal device may send uplink data based on the radio resource indicated by the first OAM mode domain identifier, and the network device may receive the uplink data on the radio resource indicated by the first OAM mode domain identifier. For example, the first OAM mode domain identifier is [2] in [1, 3, N/A, 2], and the terminal device sends uplink data to the network device on the radio resource whose OAM mode domain identifier is [2]. The network device receives the uplink data on a radio resource indicated by the OAM mode domain identifier [2]. For another example, the first OAM mode domain identifier is [1], [2], or [3] in [1, 3, N/A, 2]. The terminal device sends uplink data to the network device on a radio resource whose OAM mode domain identifier is [1], [2], or [3], and the network device receives the uplink data on the radio resource indicated by the OAM mode domain identifier [1], [2], or [3]. The network device may return a response message for the uplink data to the terminal device, where the response message may be an ACK or NACK message.

Optionally, the terminal device may further send a buffer status report (buffer status report, BSR) on the radio resource indicated by the first OAM mode domain identifier. The network device may determine, based on the BSR, whether to continue to allocate, to the terminal device, the radio resource used for uplink transmission. If yes, the network device continues to send the OAM mode domain information to the terminal device, to indicate the uplink resource allocated to the terminal device. The OAM mode domain information may be the same as or different from that sent last time. The terminal device continues to send the uplink data based on the radio resource indicated by the OAM mode domain information allocated by the network device.

Optionally, before the network device sends the UL-Grant, the method may further include the following steps. The terminal device sends sounding reference information (SRS) to the network device, and the network device measures uplink channel quality based on the SRS. If a channel is good and there is a data transmission requirement, the network device allocates the uplink resource to the terminal device. The terminal device sends a scheduling request (SR) to the network device.

In S303, the terminal device determines, based on the OAM mode domain information, the radio resource used for uplink transmission or downlink transmission. In an optional embodiment, the radio resource having the OAM mode domain may further include another dimension, and the OAM mode domain may be combined with the another dimension to identify the radio resource. For example, the OAM mode domain may indicate the radio resource in combination with any one or more of the following dimensions: a time domain dimension, a frequency domain dimension, a code domain dimension, a polarization dimension, or an antenna (space) dimension.

An example in which the OAM mode domain identifies the radio resource in combination with the time domain dimension and the frequency domain dimension is used for description.

Table 5 shows a method for identifying a parameter set. An orthogonal frequency division multiplexing (OFDM) subcarrier spacing index $\mu$ and an OAM mode domain identifier m are combined to form a two-dimensional identifier vector $<\mu, m>$, and a value of a cyclic prefix is determined by the two-dimensional identifier vector.

TABLE 5

| | $\gamma$ | $\gamma_1$ | $\gamma_2$ | $\gamma_3$ | ... | |
|---|---|---|---|---|---|---|
| | $\phi$ | $\phi_1$ | $\phi_2$ | $\phi_3$ | ... | |
| $\Delta f = 2^\mu \cdot 15$ | m | 1 | 2 | 3 | ... | |
| | $\mu$ | | | | | |
| 15 | 0 | | | | | |
| 30 | 1 | | | | | |
| 60 | 2 | | | | | Cyclic prefix |
| 120 | 3 | | | | | |
| 240 | 4 | | | | | |

Figure 9:
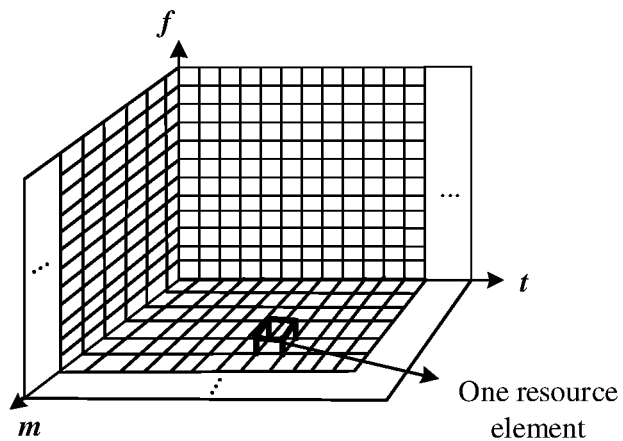
FIG. 9 is a schematic diagram of a resource element identification method according to an embodiment.

As shown in FIG. 9, a resource element identification method is used as an example. In a condition of an antenna port p and a subcarrier spacing μ, one resource element is identified by $(k,l,m)_{p,\mu}$, where k is a frequency domain identifier index, l is a time domain identifier index, and m is an OAM mode domain identifier.

In the foregoing embodiments provided in this disclosure, the method provided in embodiments is separately described from perspectives of the network device, the terminal device, and interaction between the network device and the terminal device. In the foregoing embodiment, for ease of description, the network device that receives the feedback from the terminal device, the network device that determines the OAM transmission parameter, and the network device that sends the OAM wave to the terminal device are a same device. However, in actual disclosure, the foregoing operations may be implemented by different network devices. In this case, corresponding information needs to be transmitted between these network devices, for example, received feedback information and/or determined transmission parameter are/is transmitted through an X2 interface. Details are not described again.

To implement the functions in the method provided in embodiments, the network device and the terminal device each may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on constraints.

Figure 10:
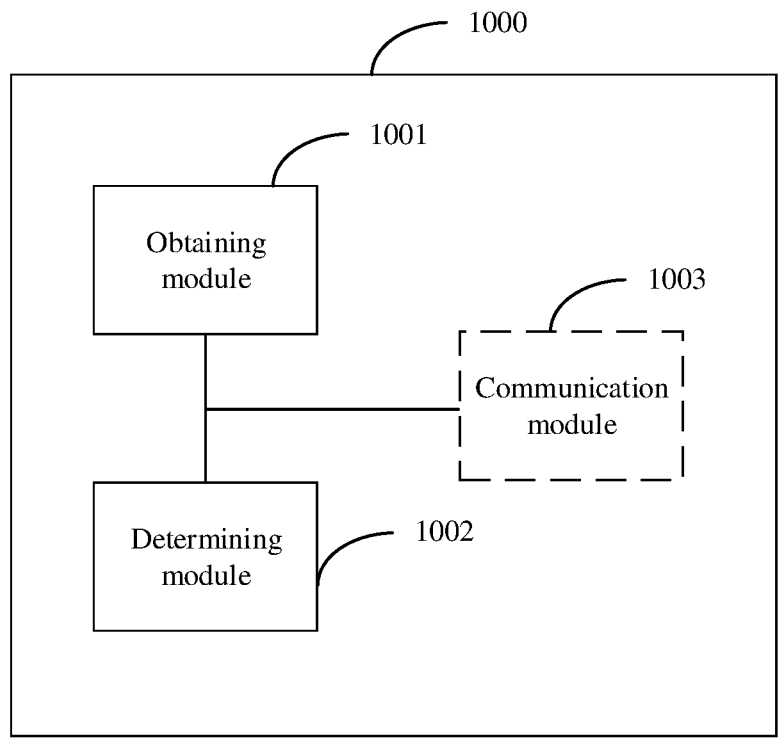
FIG. 10 is a first schematic diagram of a structure of a communication apparatus according to an embodiment.

As shown in FIG. 10, an embodiment may further provide a communication apparatus 1000. The communication apparatus 1000 may be a terminal device, an apparatus in a terminal device, or an apparatus that can be used together with a terminal device. The communication apparatus 1000 may include modules that are in a one-to-one correspondence with the methods/operations/steps/actions performed by the terminal device in the foregoing method embodiments. The modules may be implemented by a hardware circuit, software, or a combination of a hardware circuit and software. The communication apparatus 1000 may include an obtaining module 1001 and a determining module 1002.

The obtaining module 1001 is configured to obtain orbital angular momentum (OAM) mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain.

The determining module 1002 is configured to determine, based on the OAM mode domain information, a radio resource used for uplink transmission or downlink transmission.

The communication apparatus 1000 further includes:

a communication module 1003, configured to receive a first reference signal from a network device, where the first reference signal is the plane electromagnetic wave or the vortex electromagnetic wave in the specified OAM physical mode in the plurality of OAM physical modes;

the determining module 1002 is further configured to determine the reference value based on the first reference signal; and the communication module 1003 is further configured to send the reference value to the network device.

The obtaining module 1001, the determining module 1002, and the communication module 1003 are further configured to perform other operations performed by the terminal device in the foregoing method embodiments. Details are not described herein again.

Figure 11:
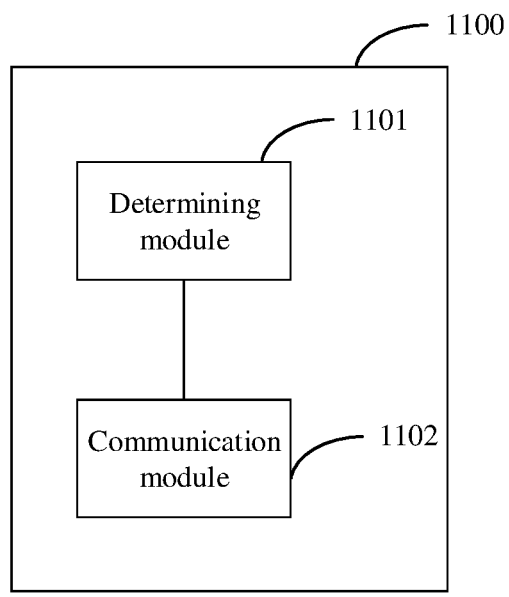
FIG. 11 is a second schematic diagram of a structure of a communication apparatus according to an embodiment.

As shown in FIG. 11, an embodiment further provides a communication apparatus 1100. The communication apparatus 1100 may be a network device, an apparatus in a network device, or an apparatus that can be used together with a network device. The communication apparatus 1100 may include modules that are in a one-to-one correspondence with the methods/operations/steps/actions performed by the network device in the foregoing method embodiments. The modules may be implemented by a hardware circuit, software, or a combination of a hardware circuit and software. The communication apparatus 1100 may include a determining module 1101 and a communication module 1102.

The determining module 1101 is configured to determine orbital angular momentum (OAM) mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain.

The communication module 1102 is configured to send the OAM mode domain information to a terminal device.

The determining module 1101 and the communication module 1102 are further configured to perform other operations performed by the network device in the foregoing method embodiments. Details are not described herein again.

Division into the modules in embodiments is an example, is merely division into logical functions, and may be other division during actual implementation. In addition, functional modules in embodiments may be integrated into one processor, or each of the modules may exist alone physically, or two or more modules may be integrated into one module. The integrated module may be implemented in a form of hardware or may be implemented in a form of a software functional module.

Figure 12:
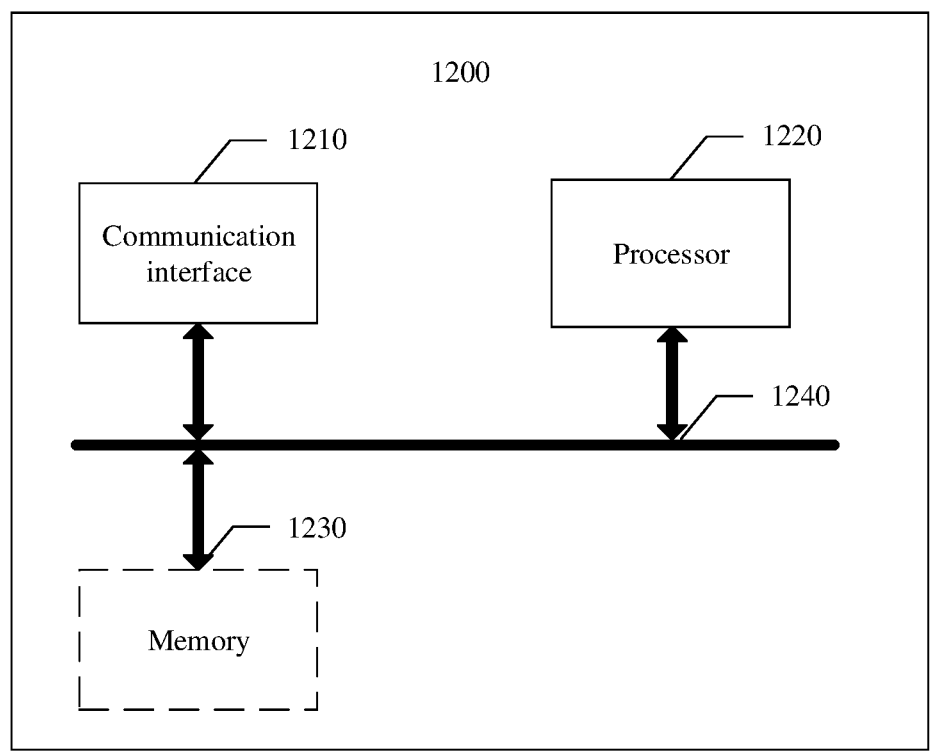
FIG. 12 is a third schematic diagram of a structure of a communication apparatus according to an embodiment.

FIG. 12 shows a communication apparatus 1200 according to an embodiment. The communication apparatus 1200 is configured to implement functions of the terminal device or the network device in the foregoing method. When implementing functions of the network device, the apparatus may be a network device, an apparatus in a network device, or an apparatus that can be used together with a network device. When implementing functions of the terminal device, the apparatus may be a terminal device, an apparatus in a terminal device, or an apparatus that can be used together with a terminal device. The apparatus may be a chip system. In this embodiment, the chip system may include a chip, or may include a chip and another discrete component. The communication apparatus 1200 includes at least one processor 1220, configured to implement functions of the terminal device or the network device in the method provided in embodiments. The apparatus 1200 may further include a communication interface 1210. In this embodiment, the communication interface may be a transceiver, a circuit, a bus, a module, or a communication interface of another type, and is configured to communicate with another device by using a transmission medium. For example, the communication interface 1210 is used for an apparatus in the communication apparatus 1200 to communicate with another device. For example, when the communication apparatus 1200 is a network device, the another device may be a terminal device. When the communication apparatus 1200 is a terminal device, the another apparatus may be a network device. The processor 1220 receives and sends data through the communication interface 1210 and is configured to implement the methods in the foregoing method embodiments. For example, when the functions of the terminal device are implemented, the processor 1220 is configured to obtain orbital angular momentum (OAM) mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain; and is configured to determine, based on the OAM mode domain information, a radio resource used for uplink transmission or downlink transmission.

When the functions of the network device are implemented, the processor 1220 is configured to determine orbital angular momentum (OAM) mode domain information, where the OAM mode domain information includes a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value includes a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain; and the communication interface 1210 is configured to send the OAM mode domain information to a terminal device.

The processor 1220 and the communication interface 1210 may further be configured to perform another corresponding step or operation performed by the terminal device or the network device in the foregoing method embodiments. Details are not described herein again.

The communication apparatus 1200 may further include at least one memory 1230, configured to store program instructions and/or data. The memory 1230 is coupled to the processor 1220. The coupling in this embodiment may be an indirect coupling or a communication connection between apparatuses, units, or modules in an electrical form, a mechanical form, or another form, and is used for information exchange between the apparatuses, the units, or the modules. The processor 1220 may operate in collaboration with the memory 1230. The processor 1220 may execute the program instructions stored in the memory 1230. At least one of the at least one memory may be integrated with the processor.

In this embodiment, a connection medium between the communication interface 1210, the processor 1220, and the memory 1230 is not limited. In this embodiment, the memory 1230, the processor 1220, and the communication interface 1210 are connected by using a bus 1240 in FIG. 12. The bus is represented by using a bold line in FIG. 12. The foregoing is merely an example for description. A connection manner of other components is not limited thereto. The bus may be classified into an address bus, a data bus, a control bus, and the like. For ease of representation, only one bold line is used to represent the bus in FIG. 12, but this does not mean that there is only one bus or only one type of bus.

When the communication apparatus 1100 and the communication apparatus 1200 may be chips or chip systems, the communication module 1102 and the communication interface 1210 may output or receive baseband signals. When the communication apparatus 1100 and the communication apparatus 1200 are devices, the communication module 1102 and the communication interface 1210 may output or receive radio frequency signals. In embodiments, the processor may be a general-purpose processor, a digital signal processor, a disclosure-specific integrated circuit, a field programmable gate array or another programmable logic device, a discrete gate or transistor logic device, or a discrete hardware component, and may implement or execute the methods, steps, and logical block diagrams disclosed in embodiments. The general purpose processor may be a microprocessor or any conventional processor or the like. The steps of the method with reference to embodiments may be directly performed by a hardware processor or may be performed by using a combination of hardware in the processor and a software module.

In embodiments, the memory 1230 may be a non-volatile memory, for example, a hard disk drive (HDD) or a solid-state drive (SSD), or may be a volatile memory, for example, a random-access memory (RAM). The memory is any other medium that can carry or store expected program code in a form of instructions or a data structure and that can be accessed by a computer but is not limited thereto. The memory in embodiments may alternatively be a circuit or any other apparatus that can implement a storage function and may be configured to store the program instructions and/or the data.

Some or all of the operations and functions that are performed by the terminal and that are described in the foregoing method embodiments, or some or all of the operations and functions that are performed by the network device and that are described in the foregoing method embodiments may be completed by using a chip or an integrated circuit.

To implement the functions of the communication apparatus in FIG. 10, FIG. 11, or FIG. 12, an embodiment further provides a chip, including a processor, configured to support the communication apparatus in implementing the functions of the terminal or the network device in the foregoing method embodiments. The chip may be connected to a memory or the chip includes the memory, and the memory may be configured to store program instructions and data that are necessary for the communication apparatus.

An embodiment provides a non-transitory computer-readable storage medium that stores a computer program. The computer program includes instructions used to perform the foregoing method embodiments.

An embodiment provides a computer program product including instructions. When the computer program product is run on a computer, the foregoing method embodiments are performed.

Persons skilled in the art should understand that embodiments may be provided as a method, a system, or a computer program product. Therefore, the embodiments may use a form of hardware only embodiments, software only embodiments, or embodiments with a combination of software and hardware. In addition, the embodiments may use a form of a computer program product that is implemented on one or more computer-usable storage media (including, but not limited to, a disk memory, a CD-ROM, an optical memory, and the like) that include computer-usable program code.

is the embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

Although some embodiments have been described, persons skilled in the art can make changes and modifications to these embodiments. Therefore, the embodiments are intended to be construed as to cover the embodiments and all changes and modifications.

What is claimed is:

1. A radio resource identification method, comprising:
obtaining orbital angular momentum (OAM) mode domain information, wherein the OAM mode domain information comprises a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value comprises a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain; and
determining, based on the OAM mode domain information, a radio resource used for uplink transmission or downlink transmission.

2. The radio resource identification method according to claim 1, wherein the OAM mode domain identifier corresponds to a first sequence number in sorting sequence numbers of a plurality of ratios, and the plurality of ratios are ratios between transmission parameters of vortex electromagnetic waves in the plurality of OAM physical modes and the reference value.

3. The radio resource identification method according to claim 2, wherein the sorting sequence numbers meet any one of the following sorting rules: descending order, ascending order, parity, modulo operation, or weighted sorting.

4. The radio resource identification method according to claim 1, wherein the OAM mode domain information further comprises any one or a combination of a plurality of the following: a crosstalk coefficient, a beam diffusion angle, or the first OAM physical mode; both the crosstalk coefficient and the beam diffusion angle correspond to the first OAM physical mode; and the crosstalk coefficient comprises: a crosstalk coefficient between the vortex electromagnetic wave and the plane electromagnetic wave in the first OAM physical mode, or a crosstalk coefficient between the vortex electromagnetic wave in the first OAM physical mode and the vortex electromagnetic wave in the specified OAM physical mode.

5. The radio resource identification method according to claim 1, further comprising:
receiving a first reference signal from a network device, wherein the first reference signal is the plane electromagnetic wave or the vortex electromagnetic wave in the specified OAM physical mode in the plurality of OAM physical modes;
determining the reference value based on the first reference signal; and
sending the reference value to the network device.

6. The radio resource identification method according to claim 5, further comprising:
receiving a plurality of second reference signals from the network device, wherein the plurality of second reference signals are the vortex electromagnetic waves in the plurality of OAM physical modes;
determining the transmission parameters of the vortex electromagnetic waves in the plurality of OAM physical modes based on the second reference signals; and
sending the transmission parameters of the vortex electromagnetic waves in the plurality of OAM physical modes to the network device.

7. The radio resource identification method according to claim 6, further comprising:
sending capability information to the network device, wherein the capability information comprises a supported OAM physical mode.

8. The radio resource identification method according to claim 5, further comprising:
receiving a mixed wave from the network device, wherein,
when the reference value is the transmission parameter of the plane electromagnetic wave, the mixed wave comprises the vortex electromagnetic waves in the plurality of OAM physical modes and the plane electromagnetic wave; or,
when the reference value is the transmission parameter of the vortex electromagnetic wave in the specified OAM physical mode in the plurality of OAM physical modes, the mixed wave comprises the vortex electromagnetic waves in the plurality of OAM physical modes; and the plurality of OAM physical modes comprise the first OAM physical mode;
determining, based on the mixed wave, a crosstalk coefficient between a vortex electromagnetic wave in each OAM physical mode and a wave corresponding to the reference value; and
sending the determined crosstalk coefficient to the network device.

9. The radio resource identification method according to claim 1, wherein the OAM mode domain identifier comprises an integer and/or a fraction.

10. The radio resource identification method according to claim 1, wherein the first transmission parameter or the transmission parameter comprises any one or a combination of the following: a signal-to-noise ratio, reference signal received power, a bit error rate, a block error rate, a packet error rate, a quantity of retransmissions upon failure, or a delay of successful transmission.

11. The radio resource identification method according to claim 1, wherein determining the radio resource based on the OAM mode domain information further comprises:
determining the radio resource based on the OAM mode domain information in combination with a time domain identifier and/or a frequency domain identifier.

12. A communication apparatus, comprising a processor, wherein the processor is configured to run a group of programs, so that the method according to claim 1 is performed.

13. The apparatus according to claim 12, wherein the apparatus is a chip or an integrated circuit.

14. A radio resource identification method, comprising:
determining orbital angular momentum (OAM) mode domain information, wherein the OAM mode domain information comprises a first OAM mode domain identifier, the first OAM mode domain identifier corresponds to a first transmission parameter of a vortex electromagnetic wave in a first OAM physical mode, or the first OAM mode domain identifier corresponds to a first ratio between the first transmission parameter and a reference value, and the reference value comprises a transmission parameter of a plane electromagnetic wave or a transmission parameter of a vortex electromagnetic wave in a specified OAM physical mode in a plurality of OAM physical modes; and any plurality of waveform symbols pass through a same vortex electromagnetic wave channel when being transmitted over resources identified by a same OAM mode domain; and
sending the OAM mode domain information.

15. The radio resource identification method according to claim 14, further comprising:
determining a plurality of OAM mode domain identifiers, wherein the plurality of OAM mode domain identifiers comprise the first OAM mode domain identifier; and
sending the plurality of OAM mode domain identifiers; and
the determining the plurality of OAM mode domain identifiers further comprises:
sending vortex electromagnetic waves in the plurality of OAM physical modes; and
receiving transmission parameters that are of the vortex electromagnetic waves in the plurality of OAM physical modes and that are fed back by a terminal device; and
obtaining the plurality of OAM mode domain identifiers according to sorting sequence numbers of the transmission parameters of the vortex electromagnetic waves in the plurality of OAM physical modes; or
sending a reference electromagnetic wave; and
receiving a transmission parameter that is of the reference electromagnetic wave and that is fed back by a terminal device; and
sending vortex electromagnetic waves in the plurality of OAM physical modes to the terminal device; and
receiving transmission parameters that are of the vortex electromagnetic waves in the plurality of OAM physical modes and that are fed back by the terminal device; and
determining a ratio between a transmission parameter of a vortex electromagnetic wave in each OAM physical mode to a transmission parameter of the reference electromagnetic wave, to obtain a plurality of ratios corresponding to the plurality of OAM physical modes; and
obtaining the plurality of OAM mode domain identifiers according to sorting sequence numbers of the plurality of ratios, wherein the reference electromagnetic wave is the plane electromagnetic wave or the vortex electromagnetic wave in the specified OAM physical mode in the plurality of OAM physical modes.

16. The radio resource identification method according to claim 15, further comprising:
receiving capability information from the terminal device, wherein the capability information indicates an OAM physical mode supported by the terminal device; and
determining, based on the capability information, the vortex electromagnetic waves that are in the plurality of OAM physical modes and that are sent to the terminal device.

17. The radio resource identification method according to claim 15, further comprising:
sending a mixed wave, wherein the mixed wave comprises the vortex electromagnetic waves in the plurality of OAM physical modes and the reference electromagnetic wave, and the reference electromagnetic wave is the plane electromagnetic wave or the vortex electromagnetic wave in the specified OAM physical mode in the plurality of OAM physical modes;

receiving, from the terminal device, crosstalk coefficients between each of the vortex electromagnetic waves in the plurality of OAM physical modes and the reference electromagnetic wave; and sending, to the terminal device, the crosstalk coefficients respectively corresponding to the plurality of OAM mode domain identifiers.

18. The radio resource identification method according to claim 15, further comprising:

determining beam diffusion angles of the plurality of OAM physical modes; and sending the beam diffusion angles respectively corresponding to the plurality of OAM mode domain identifiers.

19. The radio resource identification method according to claim 14, wherein the OAM mode domain identifier comprises an integer and/or a fraction.

20. The radio resource identification method according to claim 14, wherein the transmission parameter comprises any one or a combination of the following: a signal-to-noise ratio, reference signal received power, a bit error rate, a block error rate, a packet error rate, a quantity of retransmissions upon failure, or a delay of successful transmission.

\* \* \* \* \*